US011466984B2

(12) United States Patent
Plouzek et al.

(10) Patent No.: US 11,466,984 B2
(45) Date of Patent: Oct. 11, 2022

(54) BUCKET GET MONITORING SYSTEM

(71) Applicant: Caterpillar Inc., Deerfield, IL (US)

(72) Inventors: John Michael Plouzek, Peoria, IL (US); Mitchell Chase Vlaminck, Germantown Hills, IL (US); Nolan S. Finch, Chicago, IL (US)

(73) Assignee: Caterpillar Inc., Peoria, IL (US)

( * ) Notice: Subject to any disclaimer, the term of this patent is extended or adjusted under 35 U.S.C. 154(b) by 72 days.

(21) Appl. No.: 16/412,673

(22) Filed: May 15, 2019

(65) Prior Publication Data

US 2020/0363203 A1 Nov. 19, 2020

(51) Int. Cl.
| *G01C 11/10* | (2006.01) |
| *E02F 9/08* | (2006.01) |
| *E02F 9/26* | (2006.01) |
| *H04N 5/225* | (2006.01) |
| *H04N 5/232* | (2006.01) |
| *G06T 7/80* | (2017.01) |

(52) U.S. Cl.
CPC ............ *G01C 11/10* (2013.01); *E02F 9/0858* (2013.01); *E02F 9/264* (2013.01); *G06T 7/80* (2017.01); *H04N 5/2251* (2013.01); *H04N 5/23216* (2013.01); *G06T 2207/30244* (2013.01); *G06T 2207/30252* (2013.01)

(58) Field of Classification Search
None
See application file for complete search history.

(56) References Cited

U.S. PATENT DOCUMENTS

| 9,139,977 | B2 | 9/2015 | Mccain et al. | |
| 2010/0142759 | A1* | 6/2010 | Ridley | E02F 9/2808 382/107 |
| 2010/0328504 | A1* | 12/2010 | Nikula | H04N 5/23203 348/273 |
| 2014/0105481 | A1* | 4/2014 | Hasselbusch | G06T 7/0006 382/141 |
| 2015/0339810 | A1* | 11/2015 | Lim | G06K 9/52 382/152 |
| 2016/0237657 | A1* | 8/2016 | Carpenter | E02F 9/2841 |
| 2017/0094154 | A1 | 3/2017 | Kawamoto | |
| 2020/0293500 | A1* | 9/2020 | Patil | H04L 9/0643 |

\* cited by examiner

*Primary Examiner* — Leon Viet Q Nguyen
(74) *Attorney, Agent, or Firm* — Law Office of Kurt J. Fugman LLC

(57) ABSTRACT

An ECU includes a memory including computer executable instructions for monitoring the condition of a ground engaging tool, and a processor coupled to the memory and configured to execute the computer executable instructions, the computer executable instructions when executed by the processor cause the processor to: acquire an image of the ground engaging tool, evaluate the image using an algorithm that compares the acquired image to a database of existing images to determine the damage, the amount of wear, or the absence of the ground engaging tool, and grade the quality of the acquired image.

20 Claims, 23 Drawing Sheets

BUCKET GET MONITORING SYSTEM

TECHNICAL FIELD

The present disclosure relates to machines such as earth moving, mining, construction machines and the like that use work tools to move objects or manipulate material. More specifically, the present disclosure relates to such machines that use a ground engaging tool monitoring system that allows the operator or a control system of such a machine to detect if a ground engaging tool becomes worn, damaged, or missing.

BACKGROUND

Machines are routinely used in the earthmoving, construction, mining and other similar industries. These machines are used for various purposes and therefore employ a host of different work tools. For example, a hydraulic mining shovel, such as one having a bucket facing forward (sometimes referred to as a hydraulic mining shovel with a front shovel, abbreviated HMS-FS) may use a bucket with ground engaging tools (GET) for penetrating the earth, scooping and holding the earth, and moving the earth to another location. In some cases, the ground engaging tool may become worn, damaged, or may be missing altogether after repeated use. If not detected, the efficiency of the work tool such as a bucket may be negatively impacted.

To alleviate this problem, sensors such as cameras and the like may be employed that provide a view of the ground engaging tool to alert the operator that a ground engaging tool needs maintenance or to be replaced. The camera may send a picture to the cab of the machine that may be watched by the operator to detect this problem.

However, only one such camera or other sensor is typically provided. So, monitoring the condition of a ground engaging tool may be difficult in some situations. Particularly, such systems are often inadequate for detecting the wear of the ground engaging tool to a desirable level of precision.

For example, U.S. Pat. No. 9,139,977 B2 to McCain et al. discloses a system for determining an orientation of an implement on a vehicle. The system includes a camera mounted to the vehicle, and a target object within a field of vision of the camera and mounted to the implement. The target object includes markings to enable a determination of the orientation of the implement with respect to the camera. So, a method of determining an orientation of an implement on a vehicle is provided. Likewise, a system of orienting an implement is provided. Another method of installing an implement orientation system is provided. A computer-readable medium having stored thereon computer-executable instructions is also provided. The computer executable instructions cause a processor to perform a method of determining an orientation of an implement when executed.

Similarly, U.S. Pat. Application Publ. No. 2017/0094154 A1 to Kawamoto et al. discloses a multi camera monitoring system mounted in the cab for determining whether positioning corrections are required for the machine. A correction system of an image pickup apparatus includes at least two image pickup apparatuses and a processing apparatus that changes a parameter defining a posture of the second image pickup apparatus by setting a distance between a first image pickup apparatus and a second image pickup apparatus constant in the at least two image pickup apparatuses, searches a corresponding portion between a pair of images obtained by the first image pickup apparatus and the second image pickup apparatus, and obtains the parameter based on the searched result.

As can be seen, the '977 patent and the '154 published patent application do not address when to service or replace a GET. Accordingly, it is desirable to develop a ground engaging tool monitoring system that provides better precision and reliability of determining whether a GET is missing, damaged, or worn so that the GET may be serviced or replaced in a timely fashion.

SUMMARY OF THE DISCLOSURE

A method according to an embodiment of the present disclosure for monitoring the condition of a ground engaging tool attached to a work too of a machine using a GET monitoring system is provided. The method may comprise acquiring an image of the ground engaging tool, evaluating the image using an algorithm that compares the acquired image to a database of existing images to determine the presence, the amount of wear, or the absence of the ground engaging tool, and grading the quality of the acquired image to determine if the quality of the acquired image is poor or acceptable.

A GET monitoring system for monitoring the condition of a ground engaging tool installed on a work tool according to another embodiment of the present disclosure is provided. The system may comprise at least one sensor that is configured to monitor the position or the orientation of the work tool or the ground engaging tool, and an electronic controller unit coupled to the at least one sensor, wherein the electronic controller unit is configured to: acquire an image of the ground engaging tool, evaluate the image using an algorithm that compares the acquired image to a database of existing images to determine the amount of damage, the amount of wear, or the absence of the ground engaging tool, and grade the quality of the acquired image to determine if the quality of the acquired image is poor or acceptable unless certain conditions are determined to be present.

An electronic controller unit of a machine according another embodiment of the present disclosure is provided. The ECU may comprise a memory including computer executable instructions for monitoring the condition of a ground engaging tool, and a processor coupled to the memory and configured to execute the computer executable instructions, the computer executable instructions when executed by the processor cause the processor to: acquire an image of the ground engaging tool, evaluate the image using an algorithm that compares the acquired image to a database of existing images to determine the damage, the amount of wear, or the absence of the ground engaging tool, and grade the quality of the acquired image to determine if the quality of the acquired image is poor or acceptable unless certain conditions are determined to be present.

BRIEF DESCRIPTION OF THE DRAWINGS

The accompanying drawings, which are incorporated in and constitute a part of this specification, illustrate several embodiments of the disclosure and together with the description, serve to explain the principles of the disclosure. In the drawings.

DETAILED DESCRIPTION

Figure 1:
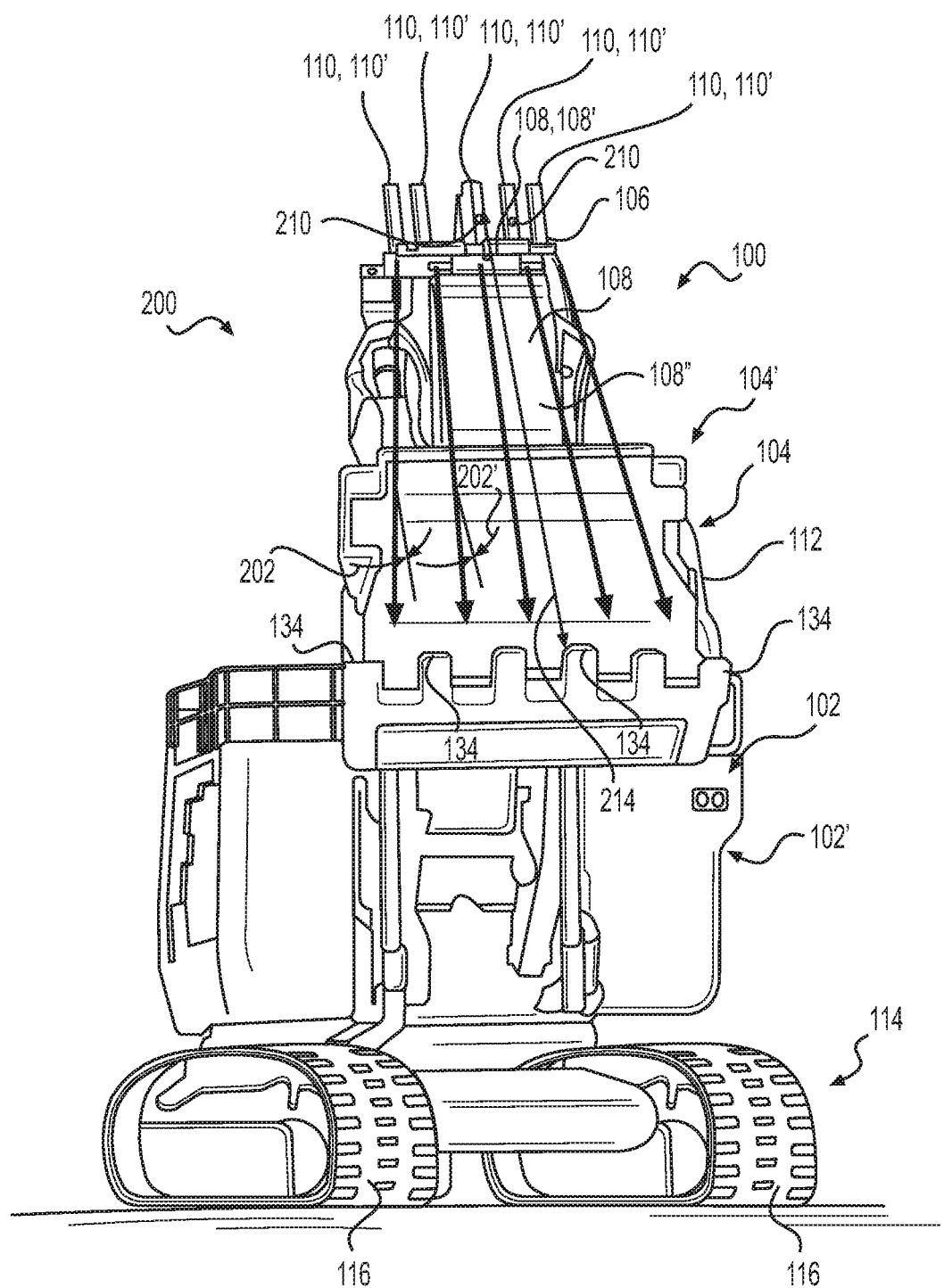
FIG. 1 is a perspective view of a machine utilizing a GET monitoring system with a plurality of sensors such as cameras to detect GET wear, damage, and presence according to an embodiment of the present disclosure.

Reference will now be made in detail to embodiments of the disclosure, examples of which are illustrated in the accompanying drawings. Wherever possible, the same reference numbers will be used throughout the drawings to refer to the same or like parts. In some cases, a reference number will be indicated in this specification and the drawings will show the reference number followed by a letter for example, 100*a*, 100*b* or by a prime for example, 100', 100" etc. It is to be understood that the use of letters or primes immediately after a reference number indicates that these features are similarly shaped and have similar function as is often the case when geometry is mirrored about a plane of symmetry. For ease of explanation in this specification, letters and primes will often not be included herein but may be shown in the drawings to indicate duplications of features, having similar or identical function or geometry, discussed within this written specification.

In various embodiments, a method for providing a ground engaging tool (GET) monitoring system, the GET monitoring system itself, and an electronic controller unit that is configured to implement the method or be used with the GET monitoring system may be provided and will now be described.

FIG. 1 illustrates a GET monitoring system 200 using on an apparatus 100, in accordance with an embodiment of the present disclosure. The apparatus 100 includes a machine 102 and a work tool 104 in an exemplary work environment. It will be appreciated that the work tool vision system 200 may include or be used with a variety of machines (e.g. bulldozers, backhoes, hydraulic mining shovels, wheel loaders, electric rope shovels, etc.), a plurality or a variety of work tools (e.g. buckets, rakes, shears, blades, rippers, compactor, chopper, wheel tip, track shoe tip, scarifiers, etc.) and the machine 102 (i.e. a HMS-FS 102') and the work tool 104 (i.e. a bucket 104') illustrated in FIG. 1 are by way of example only and not by way of limitation. Further, the work tool vision system 200 may include additional components, including but not limited to, a base station in communication with the machine 102, a satellite system in communication with the machine 102, an unmanned aerial vehicle in communication with the machine 102, and the like, to assist recognition and monitoring the condition of the ground engaging tool 134.

The machine 102 may be a movable machine or a stationary machine having movable parts. In this respect, the term "movable" may refer to a motion of the machine 102, or a part thereof, along linear Cartesian axes, and/or along angular, cylindrical, or helical coordinates, and/or combinations thereof. Such motion of the machine 102 may be continuous or discrete in time. For example, the machine 102, and/or a part of the machine 102, may undergo a linear motion, an angular motion or both. Such linear and angular motion may include acceleration, rotation about an axis, or both. By way of example only and not by way of limitation, the machine 102 may be an backhoe, excavator, a paver, a dozer, a skid steer loader (SSL), a multi-terrain loader (MTL), a compact track loader (CTL), a compact wheel loader (CWL), a harvester, a mower, a driller, a hammerhead, a ship, a boat, a locomotive, an automobile, a tractor, a hydraulic mining shove, an electric rope shovel or other machine to which the work tool 104 is attachable.

The term "ground engaging tool" as used herein is to be interpreted broadly and includes tips, teeth, shrouds or shroud protectors, etc.

Figure 2:
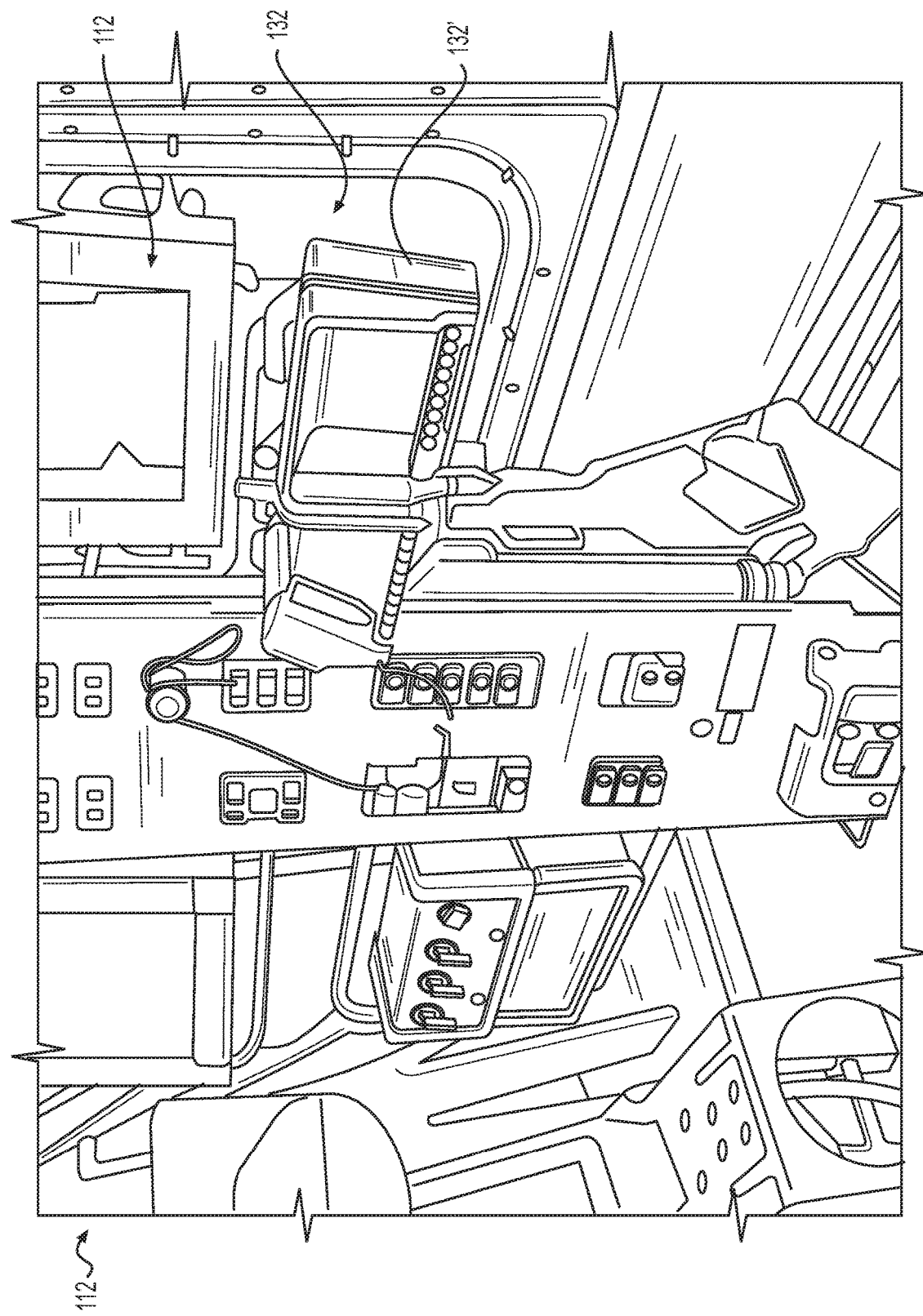
FIG. 2 illustrates the interior of the cab of the machine of FIG. 1 including a monitor used as part of the GET monitoring system of FIG. 1.
Figure 3:
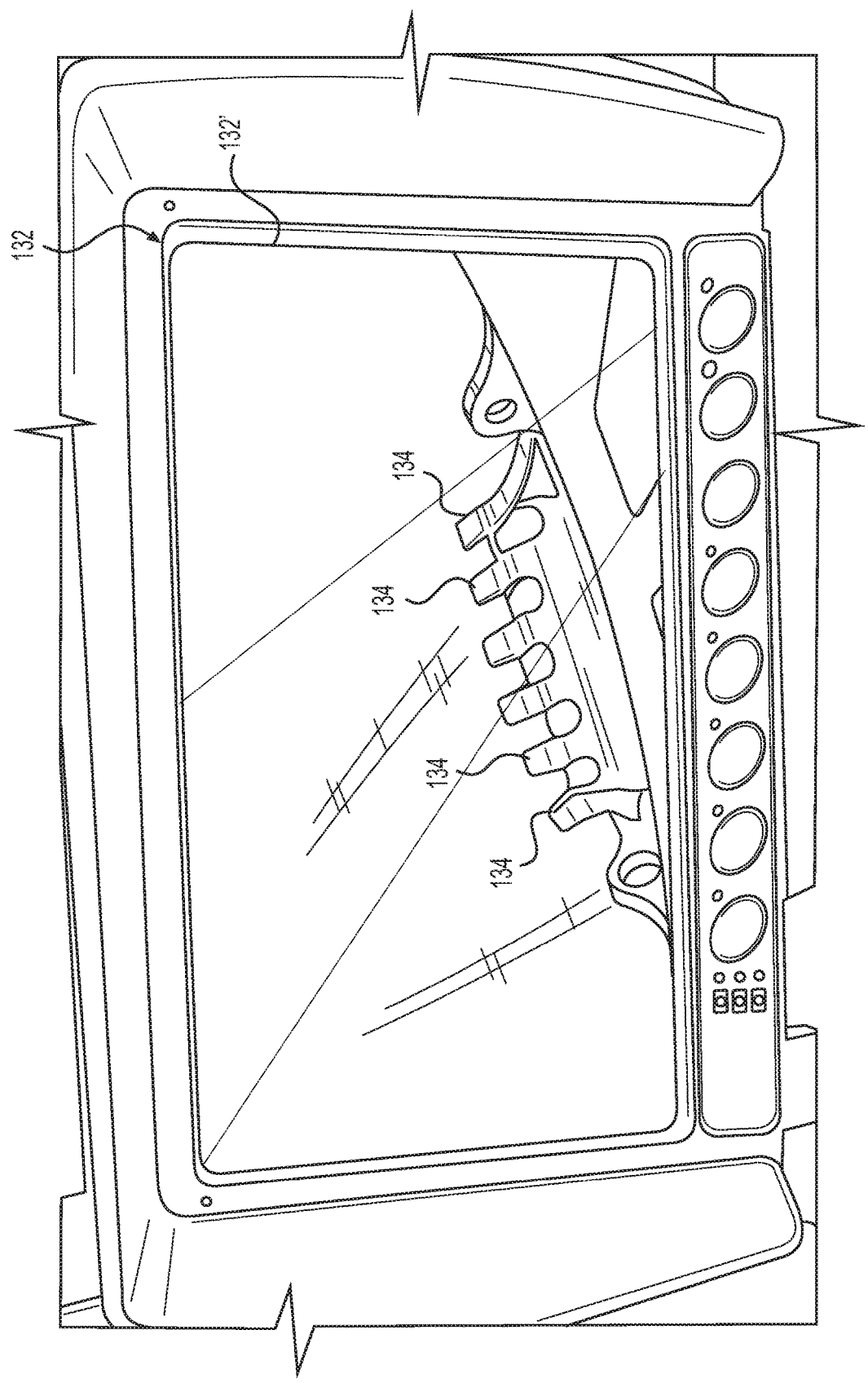
FIG. 3 is an enlarged front view of the monitor of FIG. 3 with an image of the bucket and its ground engaging tools of the machine of FIG. 1 being shown.
Figure 4:
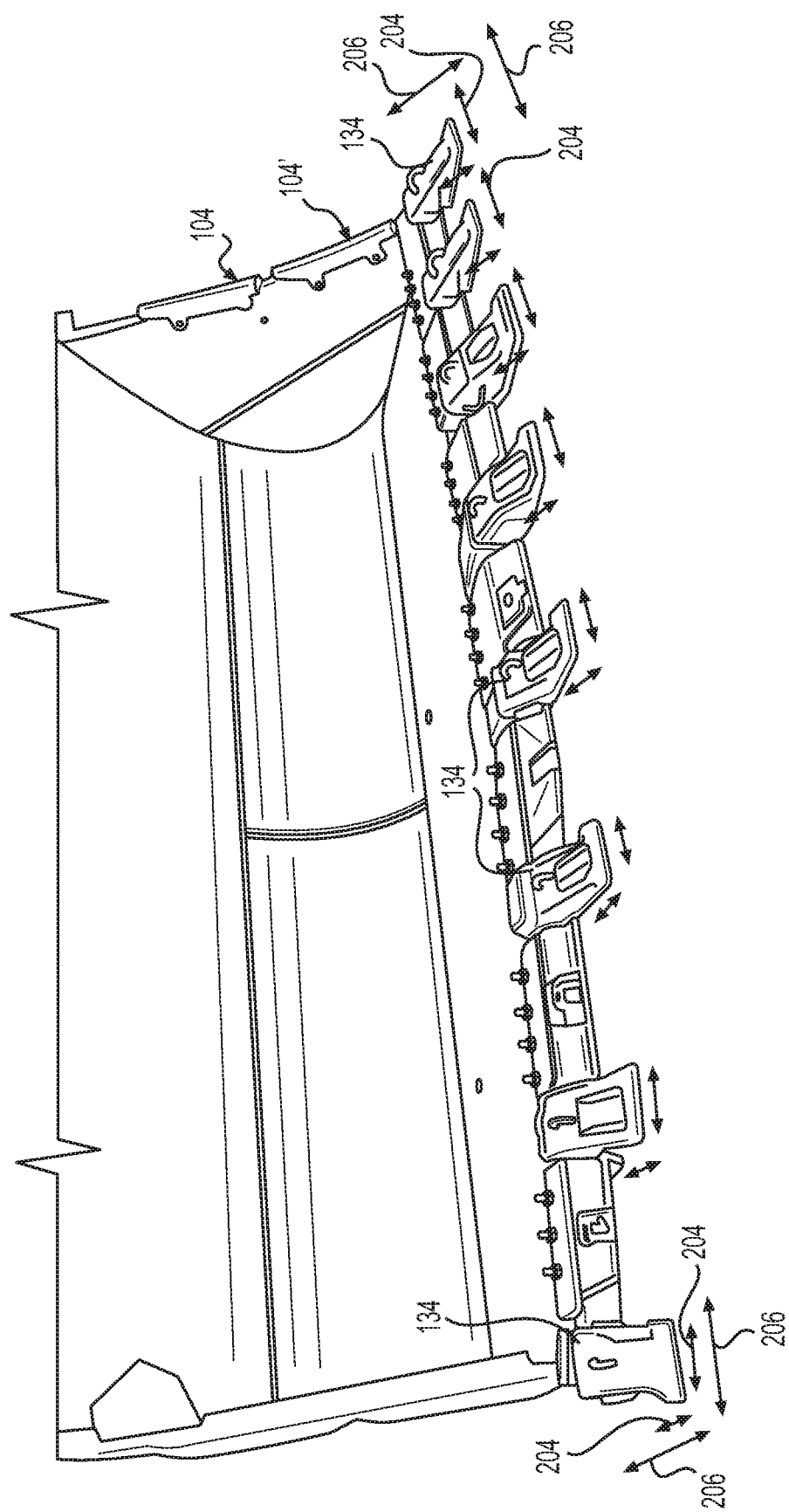
FIG. 4 is front oriented perspective view of a bucket and eight ground engaging tools (e.g. tips) and their associated width and protruding distance from the bucket being monitored by the GET monitoring system of FIG. 1.
Figure 5:
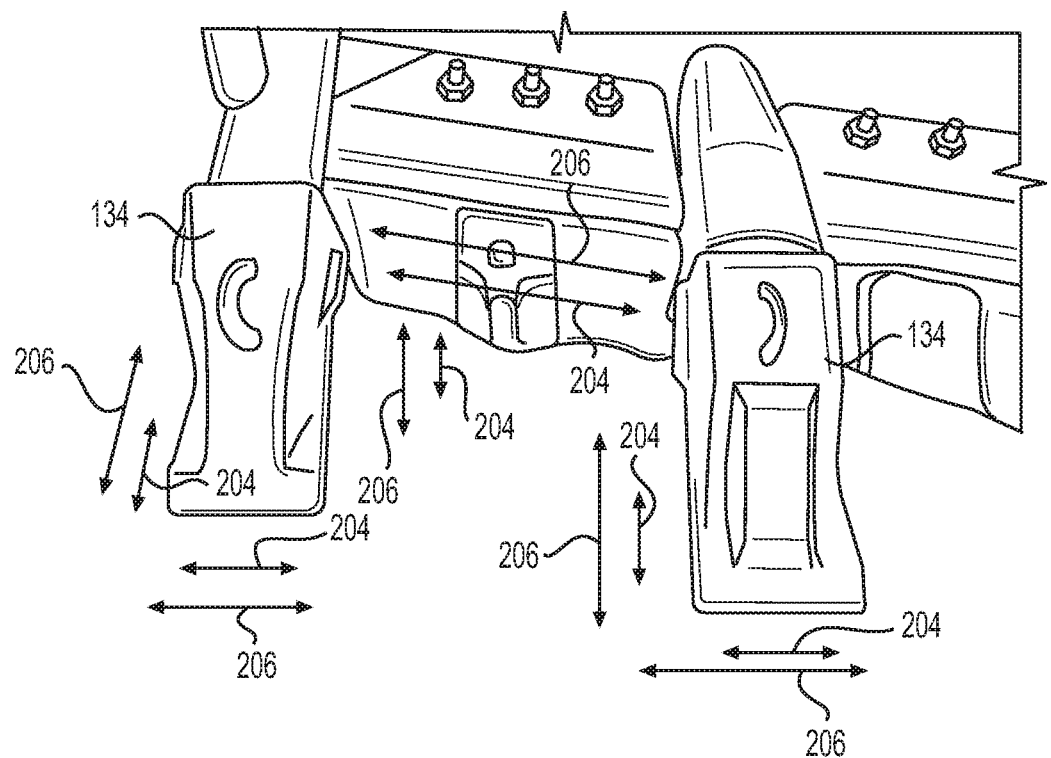
FIG. 5 shows the two leftmost instances of the ground engaging tools of FIG. 4 and a shroud interposed between them, all of which having dimensions that are being monitored by the GET monitoring system.
Figure 6:
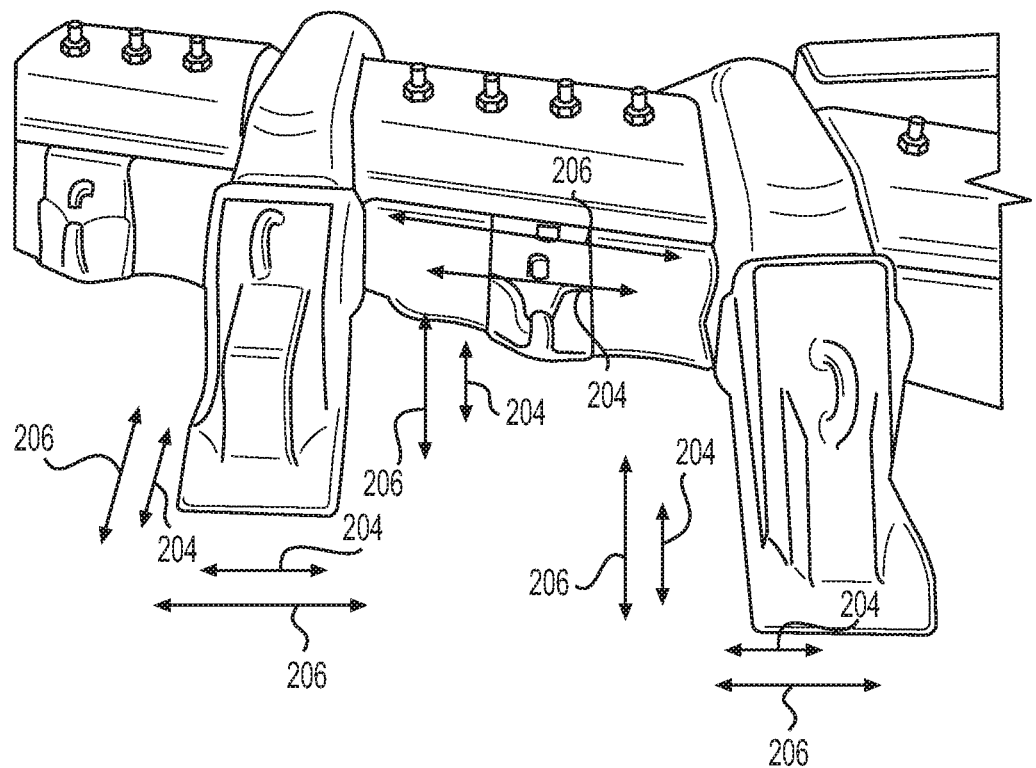
FIG. 6 is essentially the same as FIG. 5 except that the region of the bucket being monitored has been moved by one tip to the right in FIG. 4.
Figure 7:
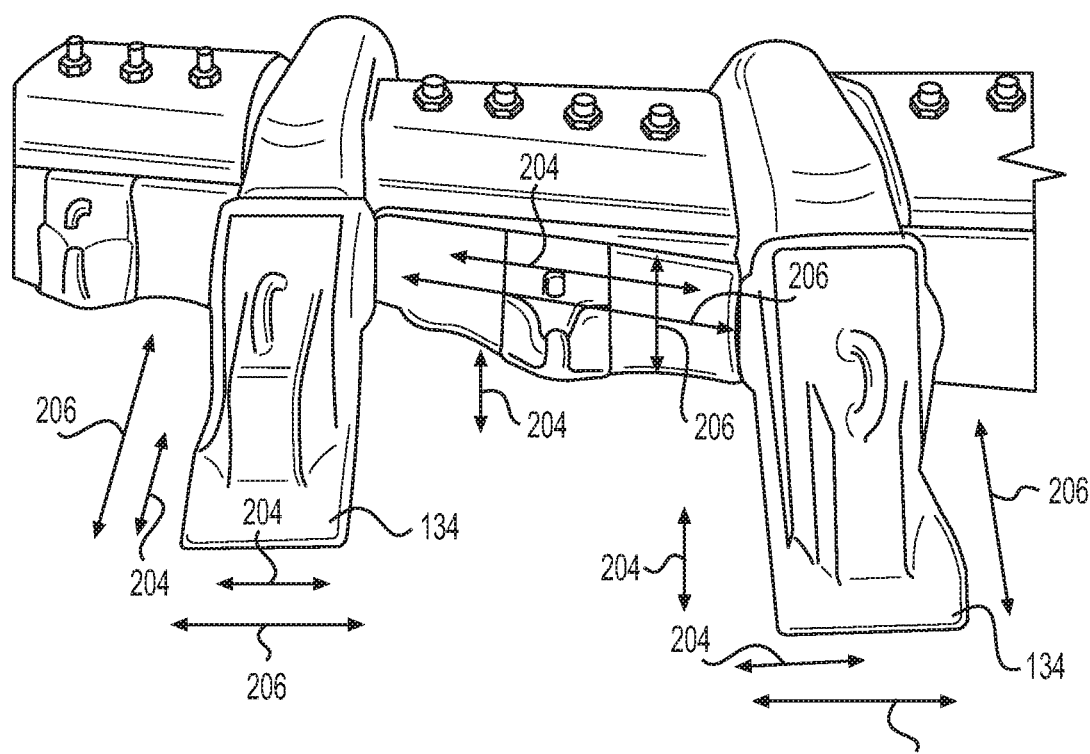
FIG. 7 is essentially the same as FIG. 6 except that the region of the bucket being monitored has been moved by one tip to the right in FIG. 4.
Figure 8:
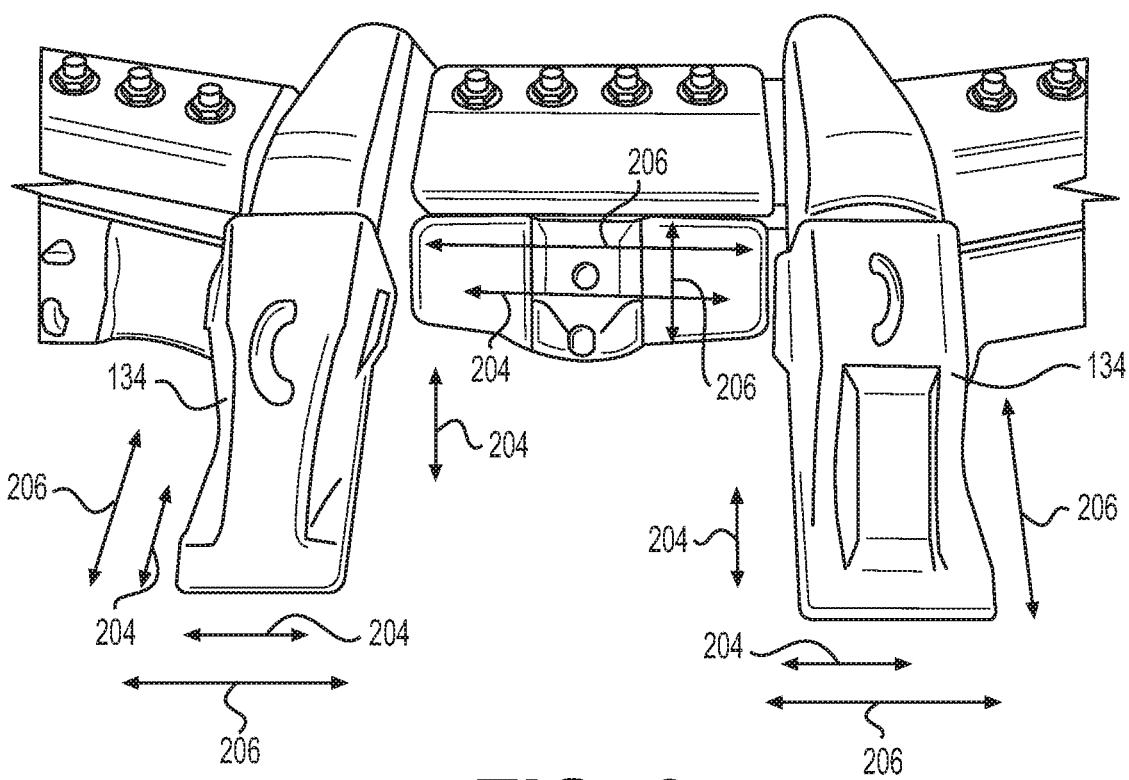
FIG. 8 is essentially the same as FIG. 7 except that the region of the bucket being monitored has been moved by one tip to the right in FIG. 4, consequently the two tips being shown are on either side of the centerline of the bucket.
Figure 9:
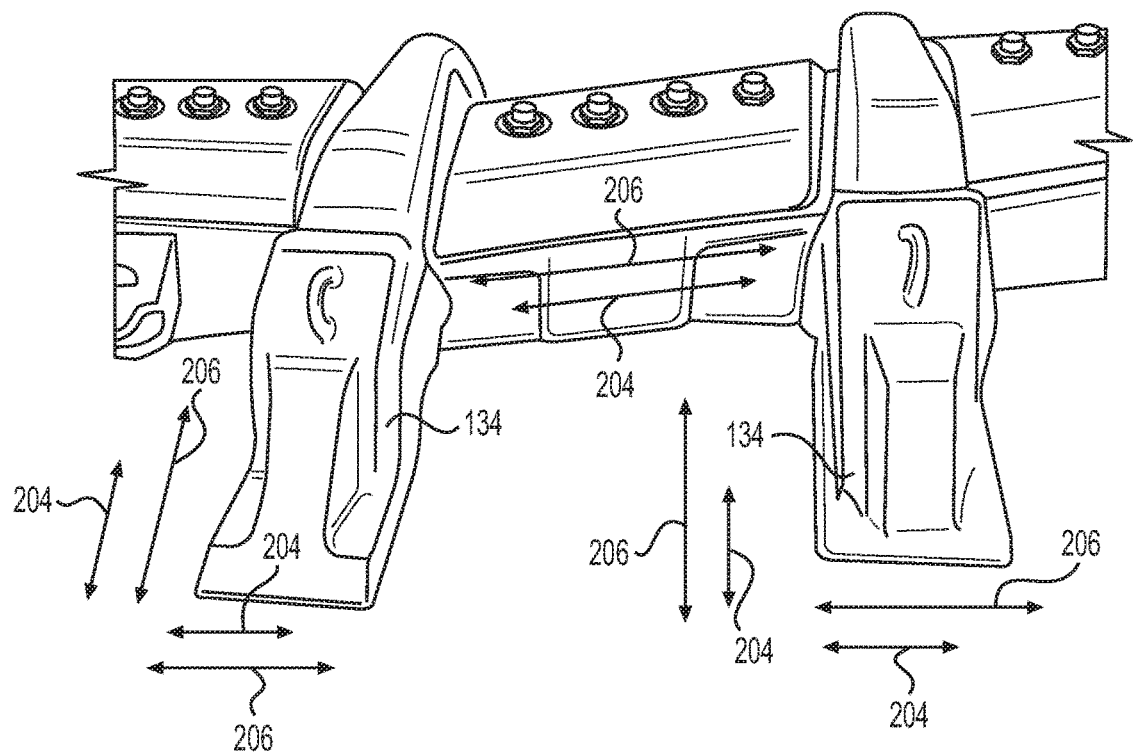
FIG. 9 is essentially the same as FIG. 8 except that the region of the bucket being monitored has been moved by one tip to the right in FIG. 4.
Figure 10:
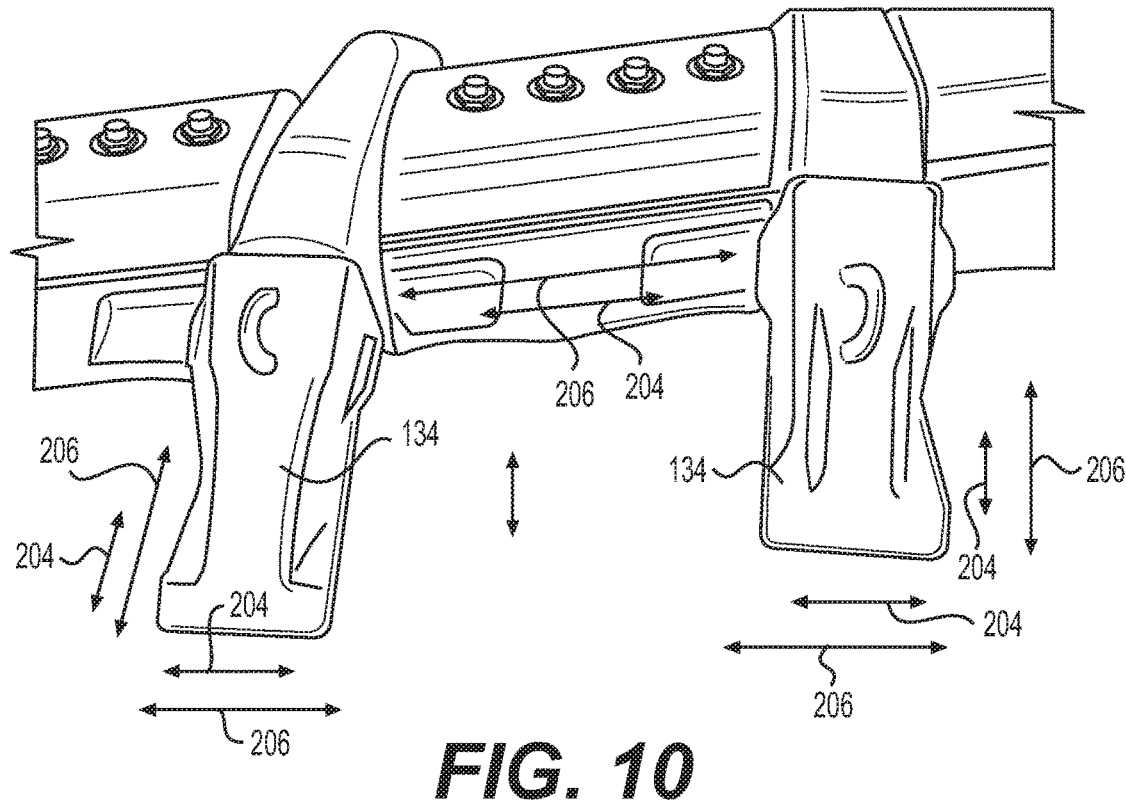
FIG. 10 is essentially the same as FIG. 9 except that the region of the bucket being monitored has been moved by one tip to the right in FIG. 4.
Figure 11:
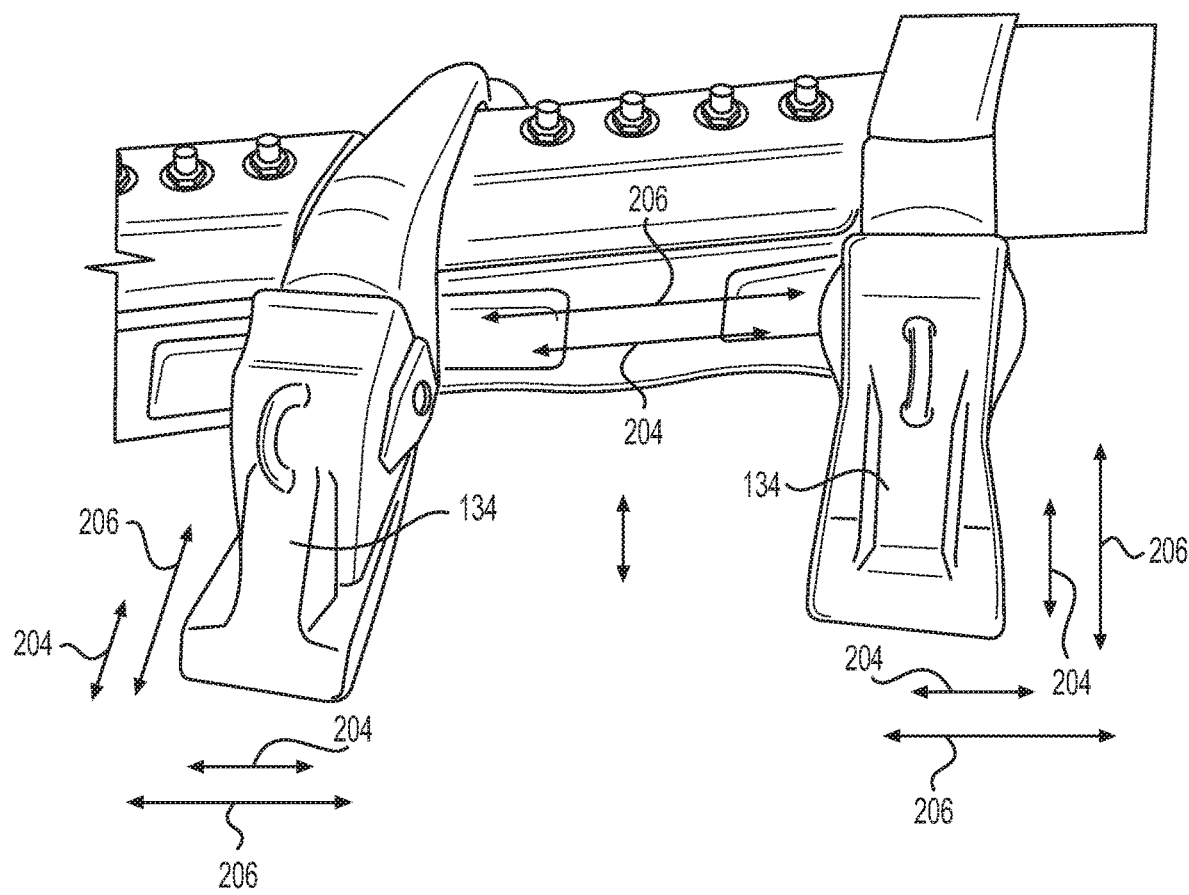
FIG. 11 is essentially the same as FIG. 10 except that the region of the bucket being monitored has been moved by one tip to the right in FIG. 4, consequently the two rightmost tips of the bucket are shown.

In the example shown in FIG. 1, the machine 102 is a HMS-FS 102' and includes a machine component 108 (e.g. a boom 108', a stick 108"), a sensor 110, an operator cab 112, and an undercarriage 114 including tracks 116. The boom 108' and the stick 108" are attached to the work tool 104 and form a joint 106 so that the work tool 104 may be moved up and down. The operator cab 112, as best seen in FIG. 2, includes, among other components, an output device 132. In FIG. 3, it is shown that the output device 132 may take the form of a monitor 132' that displays one or more ground engaging tools 134 to the operator. The operator cab 112 may be suitably sized to accommodate a human operator. Alternatively, the machine 102 may be controlled remotely from a base station, in which case, the operator cab 112 may be smaller. A steering system 124 may also be provided (shown schematically in FIG. 14) that may take the form of a steering wheel or a joystick, or other control mechanism to guide a motion of the machine 102, or parts thereof. Further, the operator cab 112 may include levers, knobs, dials, displays, lights, alarms, etc. to facilitate operation of the machine 102. The levers, knobs, and dials may be examples of input devices while displays, lights, and alarms may be examples of output devices as will be discussed later herein.

Figure 14:
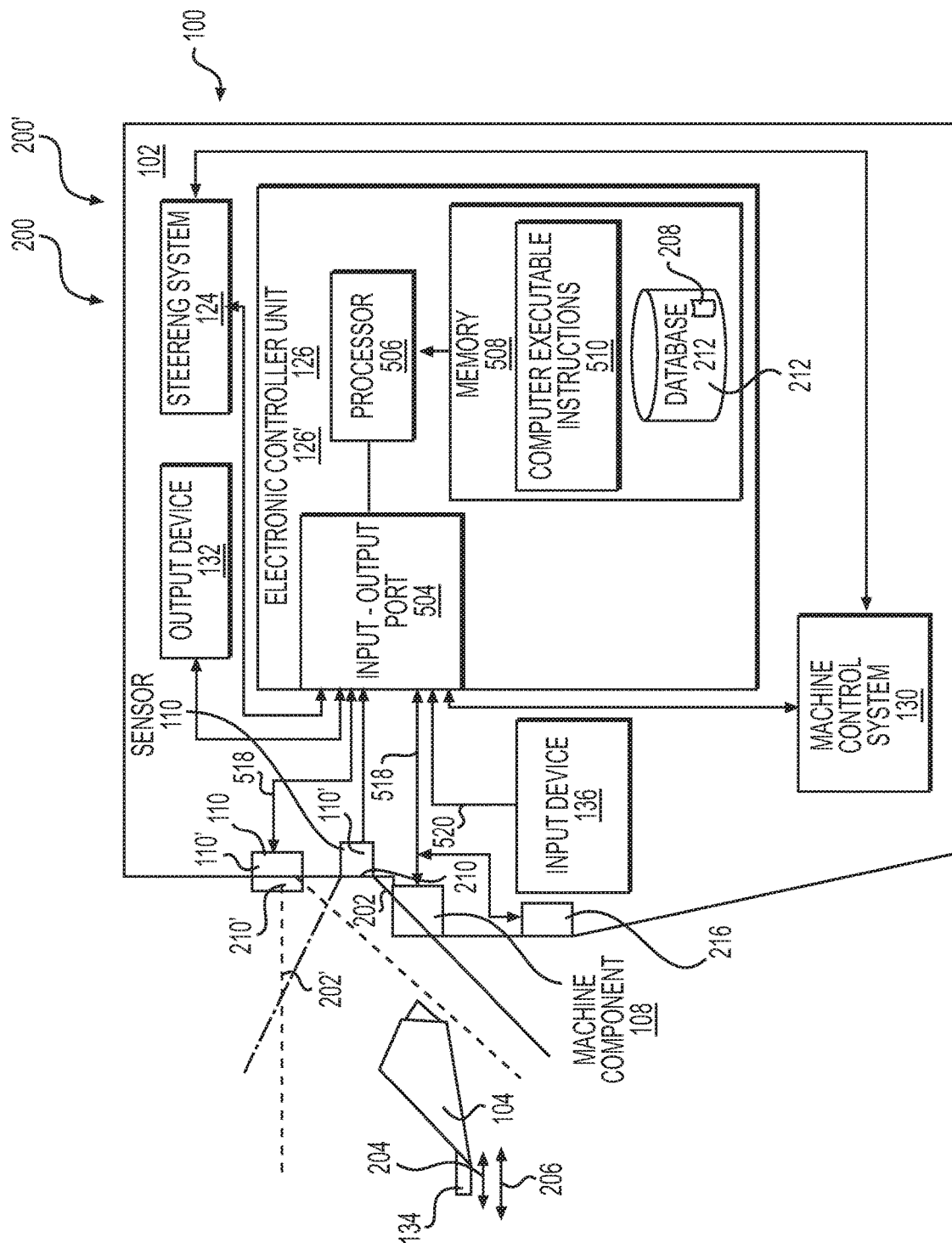
FIG. 14 contains a schematic block diagram of the GET monitoring system of the machine of FIG. 1 according to an embodiment of the present disclosure.

With continued reference to FIG. 14, the machine 102 includes an electronic controller unit 126, and a machine control system 130. The machine 102 may include other components such as transmission systems, engine(s), motors, power system(s), hydraulic system(s), suspension systems, cooling systems, fuel systems, exhaust systems, anchor systems, propelling systems, communication systems including antennas, Global Positioning Systems (GPS), and the like (not shown) that are coupled to the machine control system 130.

Referring back to FIG. 1, the machine component 108 may be a boom 108' including hydraulic cylinders and mechanical linkages, and a plurality sensors 110 may be mounted on the boom 108' near the joint 106 (or may be mounted on the stick 108", etc.). The machine component 108 may be extendable, expandable, contractible, rotatable, and translatable radially or axially, or otherwise movable by the machine 102 to move the work tool 104. For example, a height and a tilt of the machine component 108 may be variable to facilitate the raising and lower of the work tool 104. The machine component 108 may be configured to receive requisite power from the machine 102 to perform various operations (e.g., digging earth) in the exemplary worksite using the work tool 104.

In one embodiment of this disclosure, the plurality of sensors 110 may be a plurality of cameras 110'. By way of example only and not by way of limitation, the sensor 110 may be a monocular camera, a stereo camera, an infrared camera, a high resolution camera, an array of one or more types of cameras, an opto-acoustic sensor, a radar, a laser based imaging sensor, or the like, or combinations thereof, configured to assist recognition, and monitoring of the ground engaging tool 134. When a camera is used, a light to provide illumination for that camera may also be provided. Other examples of a sensor include ambient light cameras such as 2D or 3D measuring type of cameras, a camera with integral image processing capability, a medium resolution camera, and a standard resolution camera. The sensor(s) may be selected so that effective monitoring across the entire range of a large sized bucket with ground engaging feet may be performed by providing enough pixels in the image for sufficiently small resolution to distinguish small increments of change in size for any component or portion of the work tool or associated GET (fractions of an inch). In other words, any embodiment of a system discussed herein may have improved accuracy compared to prior systems. The work tool 104 is attachable to the machine 102, for example, to a linkage at an end portion of the machine component 108 (e.g. stick 108") via the attachment coupler (not shown). By way of example only and not by limitation, the work tool 104 may be a bucket 104' for moving earth (as shown in FIG. 1), a fork for lifting pallets (not shown), a harvester attachment, a drill head, a hammer head, a compactor head, or any other type of implement attachable to the machine 102. In this respect, the machine 102 may be configured to be attachable not just to one type of the work tool 104, but also to different types of the work tools 104, as well as to a plurality of work tools, ground engaging tools 134, different types of ground engaging tools 134, etc. at the same time.

With continued reference to FIG. 1, depending on the type of work tool 104 being utilized, the machine 102 may be configured to operate in an output mode specific to the type of the work tool 104. An output mode of the machine 102 is specified by appropriate electrical and mechanical parameters for operation of the work tool 104 when attached to the machine component 108. For example, an output mode for a bucket is different from an output mode of a fork in terms of an output power delivered to the work tool 104. If an incorrect output mode is selected, or if no output mode is selected by a manual operator when the work tool 104 is attached to the machine component 108, the machine 102 may not be able to properly perform, or not perform, the job for which the machine 102 was deployed.

Further, depending on the type of the work tool 104, the attachment coupler may be an attachment pin, a latch, a hook, a ball/socket joint, or other types of attachment components that make the work tool 104 able to be coupled to the machine component 108 of the machine 102. In one aspect, the work tool 104 may be stationary. In another aspect, the work tool 104 may be mobile or movable towards the machine 102. For example, another machine (not shown) may be used to push the work tool 104 to match a motion of the machine 102 and/or of the machine component 108. Also, as will be explained in further detail later herein, using an input device 136 (see FIG. 2) such as the controls that may take the form of buttons, a HMI (human machine interface) or a GUI (graphical user interface), etc., the type of work tool being used may be selected, altering the GET monitoring system 200 on where or how to look while monitoring the condition of the ground engaging tool 134.

In some embodiments of the present disclosure as represented in FIG. 14, the machine control system 130 may include various hydraulic and electrical power systems controlled by the electronic controller unit 126, based upon output signals from the electronic controller unit 126 to the machine control system 130. The machine control system 130 may include or may be coupled to the steering system 124 configured to guide a motion of the machine 102 and/or the machine component 108. In another aspect, the machine control system 130, or a part thereof, may be located remote from the machine 102, e.g., in a base station physically separated from the machine 102. In this scenario, the machine control system 130 may have a direct or indirect communication link with the electronic controller unit 126 to control the machine 102 for installing or moving the work tool 104. Various operative communication between the machine control system and the steering system may be omitted in other embodiments.

With continued reference to FIG. 14, a GET monitoring system 200 for monitoring the condition of a ground engaging tool 134 installed on a work tool 104 will now be discussed. The system 200 may comprise a plurality of sensors 110 that are configured to take measurements of a ground engaging tool 134 installed on a work tool 104 from at least two different angles 202, 202', and an electronic controller unit 126 coupled to the plurality of sensors 110. The electronic controller unit 126 may be configured to determine a dimension 204 (also see FIGS. 4 thru 11) of a ground engaging tool installed on a work tool 104, compare the determined dimension 204 of the ground engaging tool 134 installed on a work tool to a theoretical dimension 206 of a new ground engaging tool 134 installed on the work tool 104, and calculate the difference between the determined dimension 204 and the theoretical dimension 206.

Moreover, as illustrated in FIG. 14 via a schematic diagram of the GET monitoring system 200, the electronic controller unit 126 is coupled to the sensors 110, the machine control system 130, the output device 132, the steering system 124, and the input device 136 as well as to other components of the machine 102 (not shown).

Referring still to FIG. 14, the electronic controller unit 126 may be further configured to store a data template 208 of a new ground engaging tool 134 installed on the work tool 104. Furthermore, the electronic controller unit 126 may be configured to compare the difference between the determined dimension 204 and the theoretical dimension 206 to a threshold value. If the difference is below the threshold value, then the electronic controller unit 126 may be configured to create an alert that the ground engaging tool 134 needs to be serviced within some desired time interval, if the difference is above the threshold value, then the electronic controller unit 126 may be configured to create an alert that the ground engaging tool 134 is damaged or missing, requiring immediate maintenance.

The plurality of sensors 110 may include at least two cameras 110' taking images of the ground engaging tool 134 installed on the work tool 104 from two different vantage points 210.

Looking back at FIG. 1, the system 200 may further comprise a HMS-FS 102' including a boom and stick joint 106, and the plurality of cameras 110' may be mounted on top of the boom and stick joint 106 and may be oriented to take measurements of relative wear of the ground engaging tool 134 from multiple angles 202, 202' and provide the operator feedback on when to perform maintenance.

Looking at FIGS. 2, 3 and 14, the system 200 may further comprise an output device 132 that is in communication with the electronic controller unit 126. The electronic controller unit 126 may be further configured to send a signal to the output device 132 that displays an image of the ground engaging tool 134 installed on the work tool 104.

The electronic controller unit 126 may be further configured to store a database 212 of data templates 208 for various ground engaging tools 134, and to compare the determined dimension 204 of various ground engaging tools to one or more data templates 208.

As best seen in FIGS. 1 and 14, the plurality of cameras 110' are placed a fixed distance away 214 from the plurality of ground engaging tools 134, providing multiple vantage points 210 of the individual ground engaging tools 134, giving the electronic controller unit 126 sufficient 3D information to determine the relative wear between the individual ground engaging tools 134.

Figure 12:
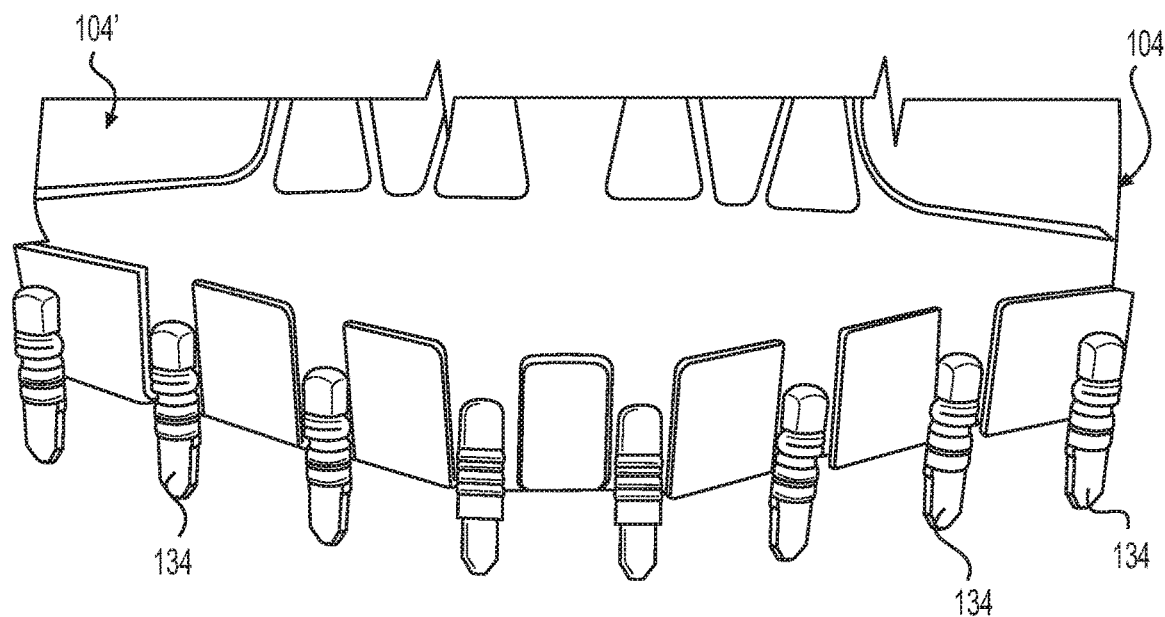
FIG. 12 shows how a GET monitoring system may target the teeth of the bucket of FIG. 4 from underneath the bucket according to an embodiment of the present disclosure.
Figure 13:
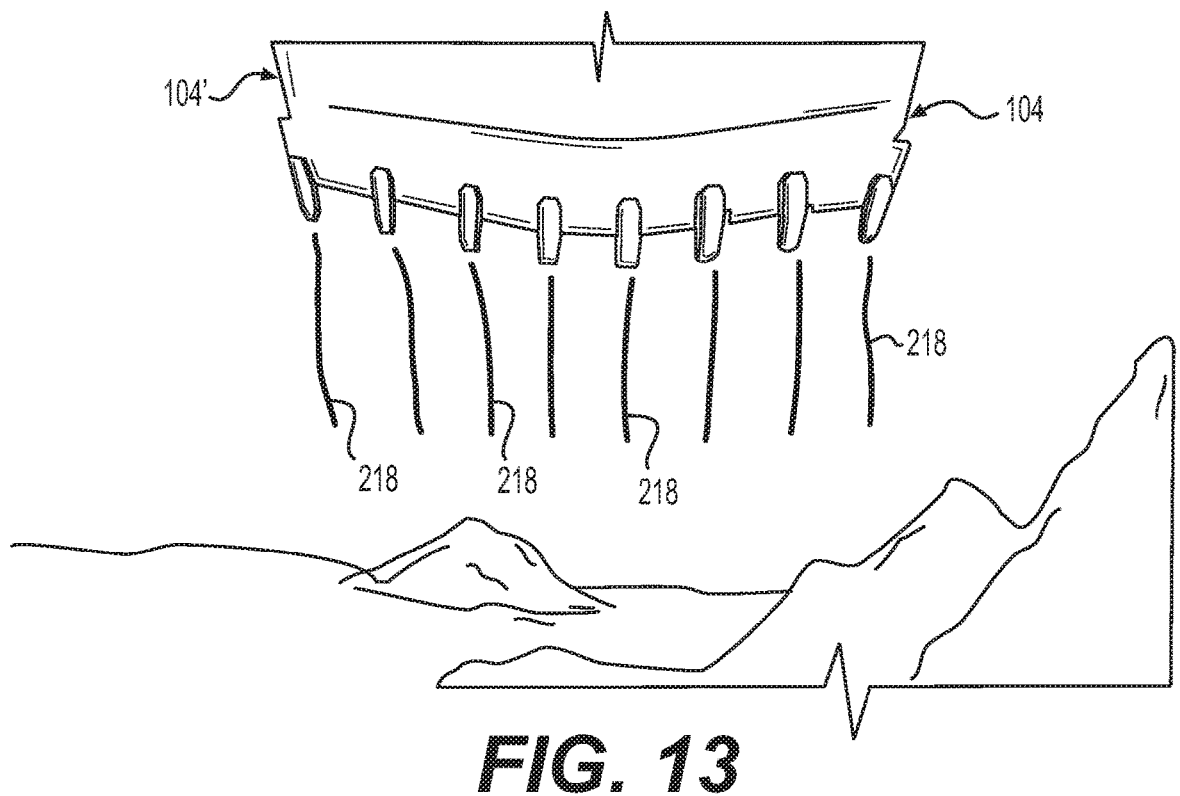
FIG. 13 shows how a GET monitoring system may use the kinematic line of action of the GET to reduce interpretations of extraneous images according to another embodiment of the present disclosure.

Looking now at FIGS. 1 and 12, at least two cameras 110' may be configured to view the bottom of the work tool 104, and the plurality of ground engaging tools 134. As shown by FIGS. 13 and 14, the electronic controller unit 126 may be configured to track the kinematic line of action 218 of the ground engaging tool 134 to reduce interpretations of extraneous images, or to interpret whether the images are taken during the day, during the night, when there is snow, when there is rain, when there is mud, when there is ice, or while the work tool 104 is moving.

Looking again at FIG. 14, the electronic controller unit 126 includes the input-output port 504, a processor 506, and the memory 508 coupled to each other, for example, by an internal bus (not shown). The electronic controller unit 126 may include additional components known to one of ordinary skill in the art, which components are not explicitly illustrated in FIG. 14. For example, the electronic controller unit 126 may include a programmable logic circuit (PLC), a timer/clocking circuit, heat sinks, visual indicators (e.g., light emitting diodes), impedance matching circuitry, internal buses, co-processors or monitor processors, batteries and power supply units, power controller chips, transceivers, wireless modules, satellite communication processing modules, and embedded systems on various integrated chips. In one embodiment, the electronic controller unit 126 may be separate from an engine controller unit (not shown). In an alternative embodiment, the electronic controller unit 126 may be integrated with or may share space and processing resources with the engine controller unit.

The input-output port 504 may be a single port or a collection of ports. The input-output port 504 is configured to transmit and receive various inputs and data from other parts of the machine 102 and forward such inputs and data to the processor 506. In one aspect, the input-output port 504 may be two separate ports, one configured to receive various input signals from various parts of the machine 102 (e.g., the sensor 110, etc.) and another configured to output signals for display (e.g., on the output device 132) or for control of the machine 102 (e.g., to the machine control system 130). Alternatively, the functionalities of inputting and outputting may be integrated into a single port illustrated as the input-output port 504 in FIG. 14.

In one aspect, the processor 506 is a hardware device such as an integrated circuit (IC) chip fabricated to implement various features and functionalities of the embodiments discussed herein. By way of example only and not by way of limitation, the processor 506 may be fabricated using a Complementary Metal Oxide Semiconductor (CMOS) fabrication technology. In one embodiment, the processor 506 may be implemented as an Application Specific Integrated Circuit (ASIC), a Field Programmable Gate Array (FPGA), a System-on-a-Chip (SOC), or the like. In another embodiment, the processor 506 may include components such as packaging, input and output pins, heat sinks, signal conditioning circuitry, input devices, output devices, processor memory components, cooling systems, power systems and the like, which are not shown in FIG. 14. In one particular embodiment, the processor 506 is configured to execute various parts of a method 800 illustrated in FIG. 15 by executing computer executable instructions 510 in the memory 508. In yet another embodiment, the processor 506 may be a plurality of processors arranged, for example, as a processing array.

The memory 508 may be implemented as a non-transitory computer readable medium. By way of example only, the memory 508 may be a semiconductor based memory device including but not limited to random access memory (RAM), read only memory (ROM), Dynamic RAM, Programmable ROM, Electrically Erasable programmable ROM (EEPROM), Static RAM, Flash memory, combinations thereof, or other types of memory devices known to one of ordinary skill in the art. In one embodiment, the memory 508 is coupled to the processor 506 directly via a communication and signal bus. In one embodiment, the memory 508 may be made of or implemented using a non-transitory computer readable storage medium on which the computer executable instructions 510 reside. The computer executable instructions 510 when executed by the processor 506 cause the processor 506 to carry out the features and functionalities of the various aspects of this disclosure. Such non-transitory computer readable storage medium may include semiconductor memory, optical memory, magnetic memory, mono- or bistable circuitry (flip-flops, etc.) and the like, or combinations thereof. Such non-transitory computer readable storage medium excludes signals that are transitory.

The computer executable instructions 510 may be executed by the processor 506 using high-level or low-level compilers and programming languages (e.g., C++). In one embodiment, the computer executable instructions 510 may be executed remotely by a base station, and results of such execution provided to the processor 506 for controlling the work tool vision system. In this respect, it will be appreciated that the specific location of the computer executable instructions 510 inside the memory 508 is by way of example only, and not by way of limitation.

In some embodiments, the memory 508 includes or is coupled to a database 212. The database 212 may include images of a plurality of ground engaging tools 134. Such images are saved as a library of image files and computerized models in the database 212. Such models or template images may include three-dimensional and two dimensional views of the plurality of ground engaging tools 134 attachable to the machine 102. Each such image or model in the database 212 may also include one or more dimensions associated with a ground engaging tool and/or a work tool, including the distance the ground engaging tool extends from the work tool, the width of the ground engaging tool, the height of the ground engaging tool, etc.

It will be appreciated that the three-dimensional and two-dimensional views taken by a camera are two visual examples of the machine 102 in operation as outputted on the output device 132, but the output device 132 may continuously display a plurality of three-dimensional scenes on a frame-by-frame basis as provided by the processor 506 to the output device 132 based upon the input signals (including the input signal 518) from the sensor 110 as modified by the processor. In one aspect, the images may be provided on a display of a remote operator of the machine 102 in a remote base station (not shown) as a real-time video of the work scene in which the machine 102 and the work tool 104 are deployed. Such frame-by-frame representation of the work environment of the machine 102 when used for recognition and monitoring the movement or the condition of the ground engaging tool 134. In other applications, the output device 132 may be located in the cab 112 of the machine 102 as shown in FIG. 1 where the operator may see directly the condition of the ground engaging tool.

Figure 26:
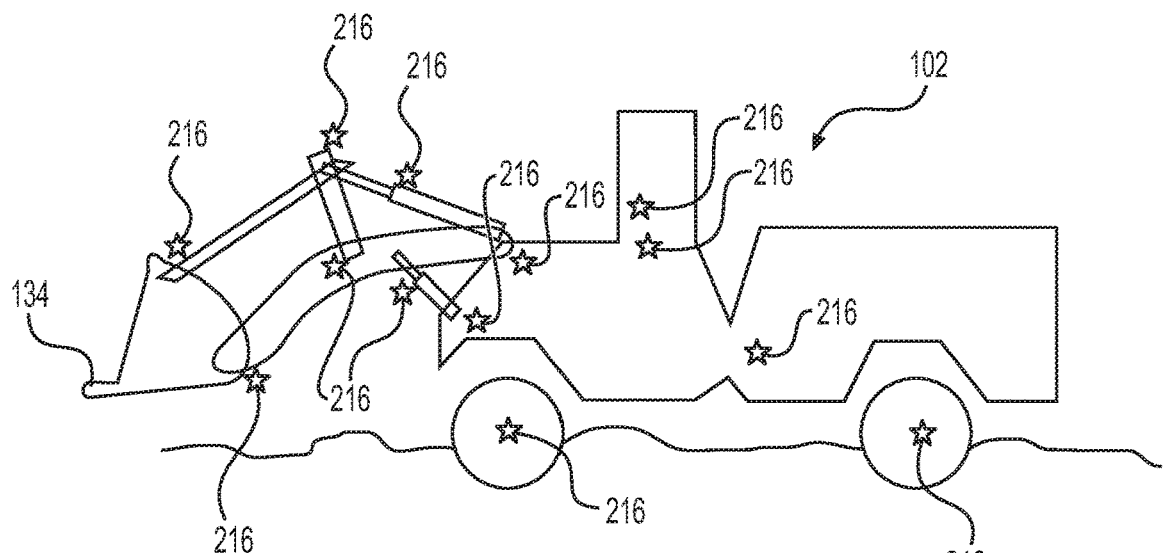
FIG. 26 illustrates how various embodiments of a machine such as a backhoe may incorporate linkage sensors to provide data for use in various embodiments of a ground engaging tool monitoring system and methods disclosed herein.
Figure 27:
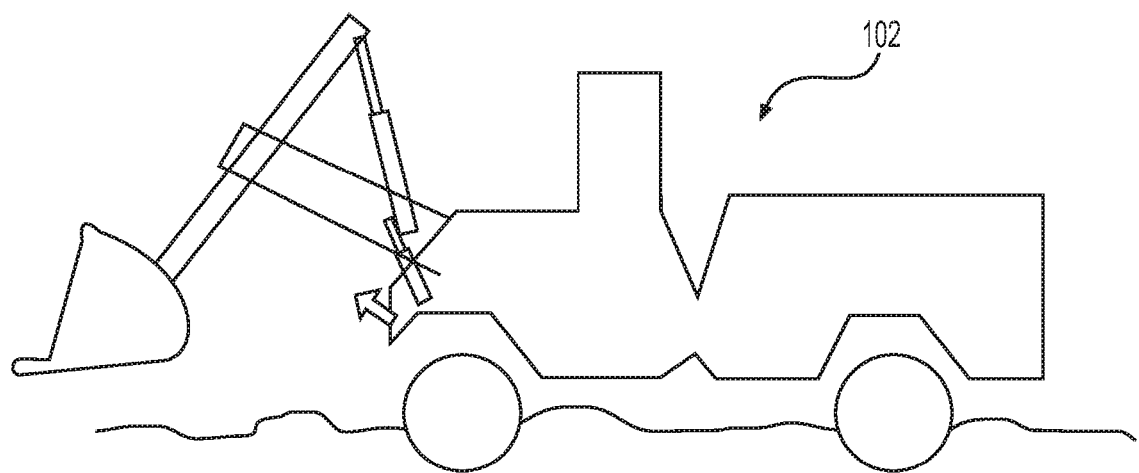
FIG. 27 discloses an example of where the sensor, the work tool such as a bucket, and the linkages controlling the movement of the bucket are positioned with the work tool in a level or a horizontal orientation. The sensor such as a camera may skip the image of the work tool and the ground engaging tool in such an instance for grading the quality of the image.
Figure 28:
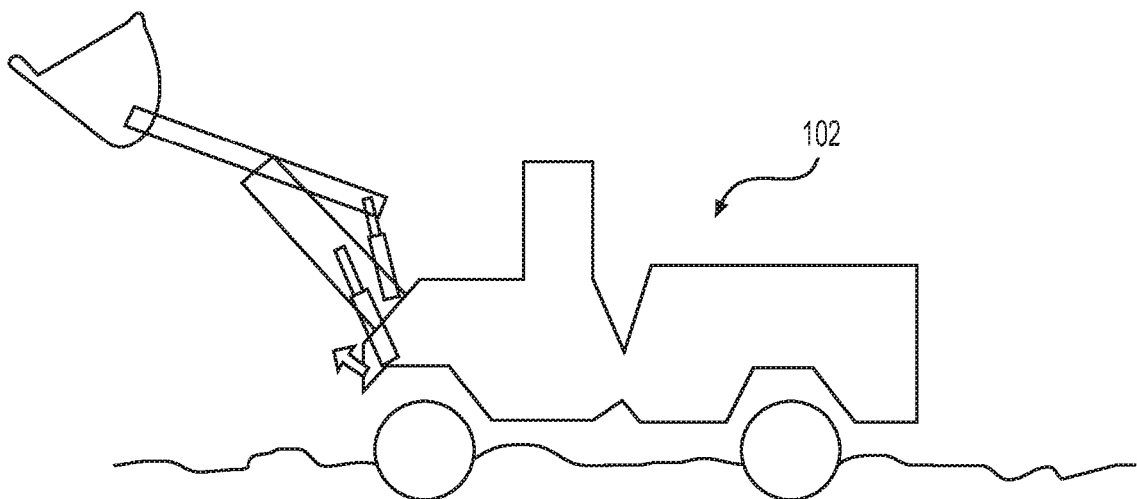
FIG. 28 discloses an example of where the sensor, the work tool such as a bucket, and the linkages controlling the movement of the bucket are in a lifting motion. The sensor such as a camera may skip the image of the work tool and the ground engaging tool for grading the quality of the image in such an instance.
Figure 29:
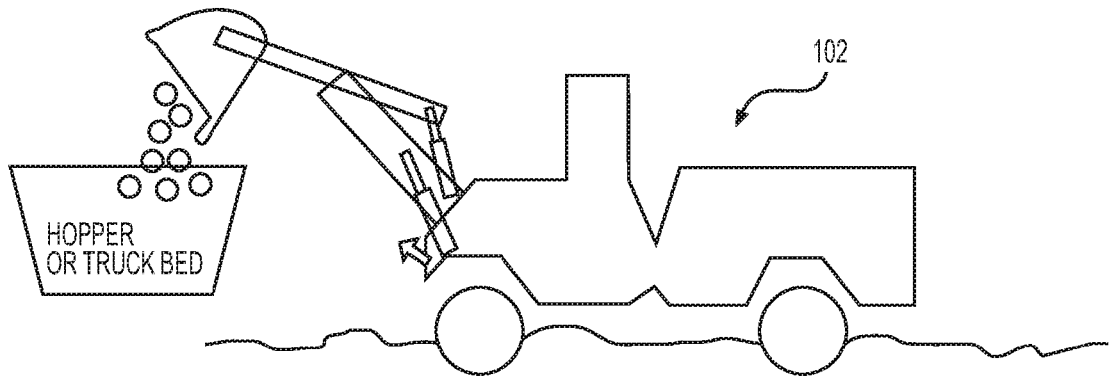
FIG. 29 discloses an example of where the sensor, the work tool such as a bucket, and the linkages controlling the movement of the bucket are in an elevated dumping motion. The sensor such as a camera may skip the image of the work tool and the ground engaging tool for grading the quality of the image in such an instance.

Referring back to FIG. 14 while also looking at FIG. 31, another embodiment of a GET monitoring system 200' for monitoring the condition of a ground engaging tool 134 installed on a work tool 104 will now be discussed. The system 200' may comprise at least one sensor 216 that is configured to monitor the position or the orientation of the work tool 104 or the ground engaging tool 134 (see also FIG. 26), and an electronic controller unit 126' coupled to the at least one sensor 216.

Figure 31:
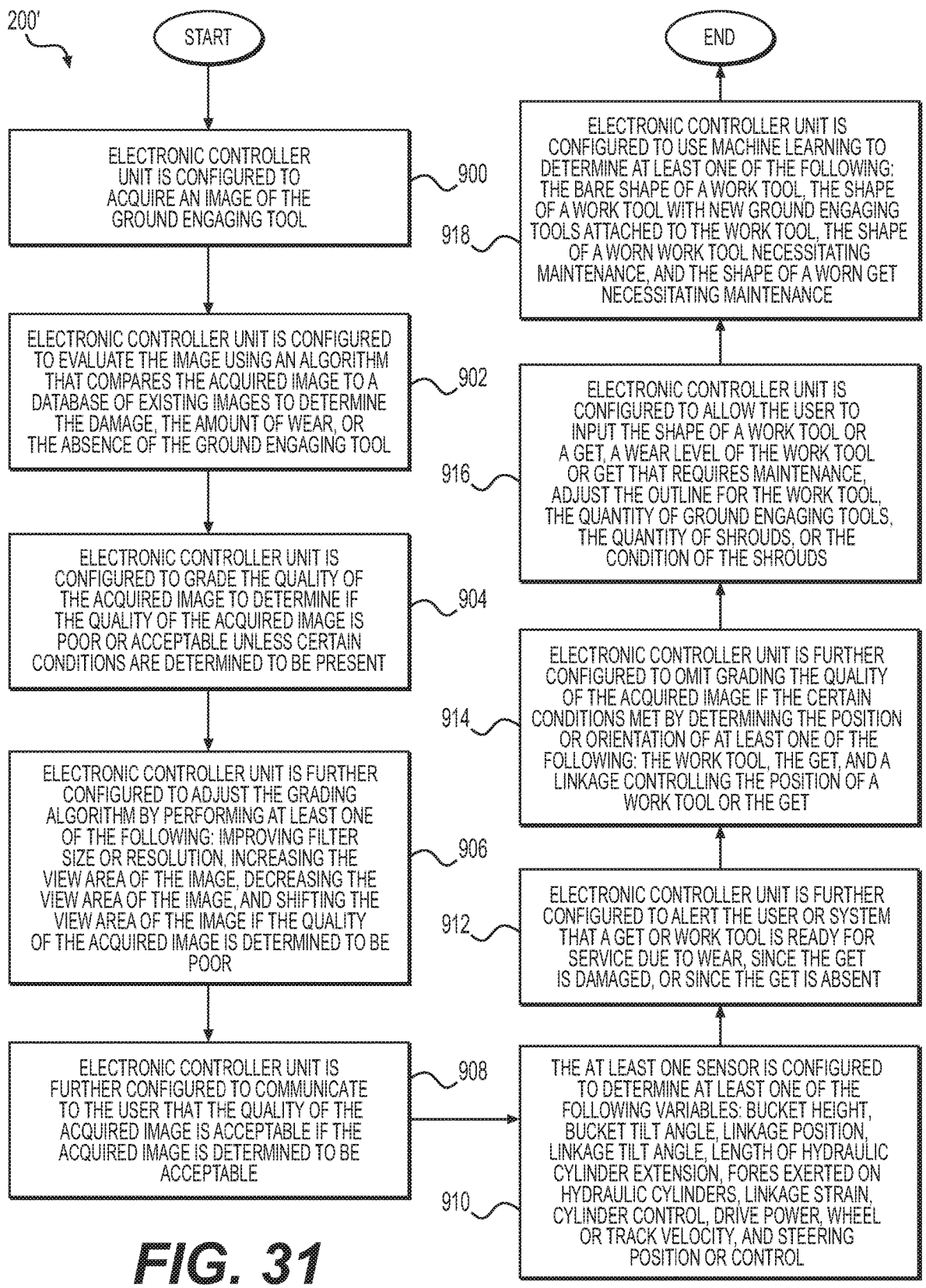
FIG. 31 contains a schematic block diagram illustrating how the electronic controller unit of the GET monitoring system of FIG. 14 may be configured.

The electronic controller unit 126' may be configured to acquire an image of the ground engaging tool 134 (see block 900 in FIG. 31), evaluate the image using an algorithm that compares the acquired image to a database of existing images to determine the amount of damage, the amount of wear, or the absence of the ground engaging tool 134 (see block 902 in FIG. 31), and grade the quality of the acquired image to determine if the quality of the acquired image is poor or acceptable unless certain conditions are determined to be present (see block 904 in FIG. 31).The electronic controller unit 126' may be further configured to adjust the grading algorithm by performing at least one of the following: improving a filter size or a resolution, increasing a view area of the image, decreasing the view area of the image, and shifting the view area of the image if the quality of the acquired image is determined to be poor (see block 906 in FIG. 31).

With continued reference to FIG. 31, the electronic controller unit 126' may be configured to communicate to the user that the quality of the acquired image is acceptable if the acquired image is determined to be acceptable (see block 908). This may be done via an output device 131 as previously discussed herein.

The at least one sensor 216 may be configured to determine at least one of the following variables: a bucket height, a bucket tilt angle, a linkage position, a linkage tilt angle, a length of hydraulic cylinder extension, a force exerted on a hydraulic cylinder, a linkage strain, a cylinder control, a drive power, a wheel or a track velocity, and a steering position or control (see block 910).

The electronic controller unit may be configured to alert a user or a system that the GET or the work tool is ready for service due to wear, since the GET is damaged, or since the GET is absent (see block 912).

The electronic controller unit may also be configured to omit grading the quality of the acquired image if the certain conditions met by determining a position or an orientation of at least one of the following: the work tool, the GET, and a linkage controlling the position of the work tool or the GET (see block 914).

Figure 20:
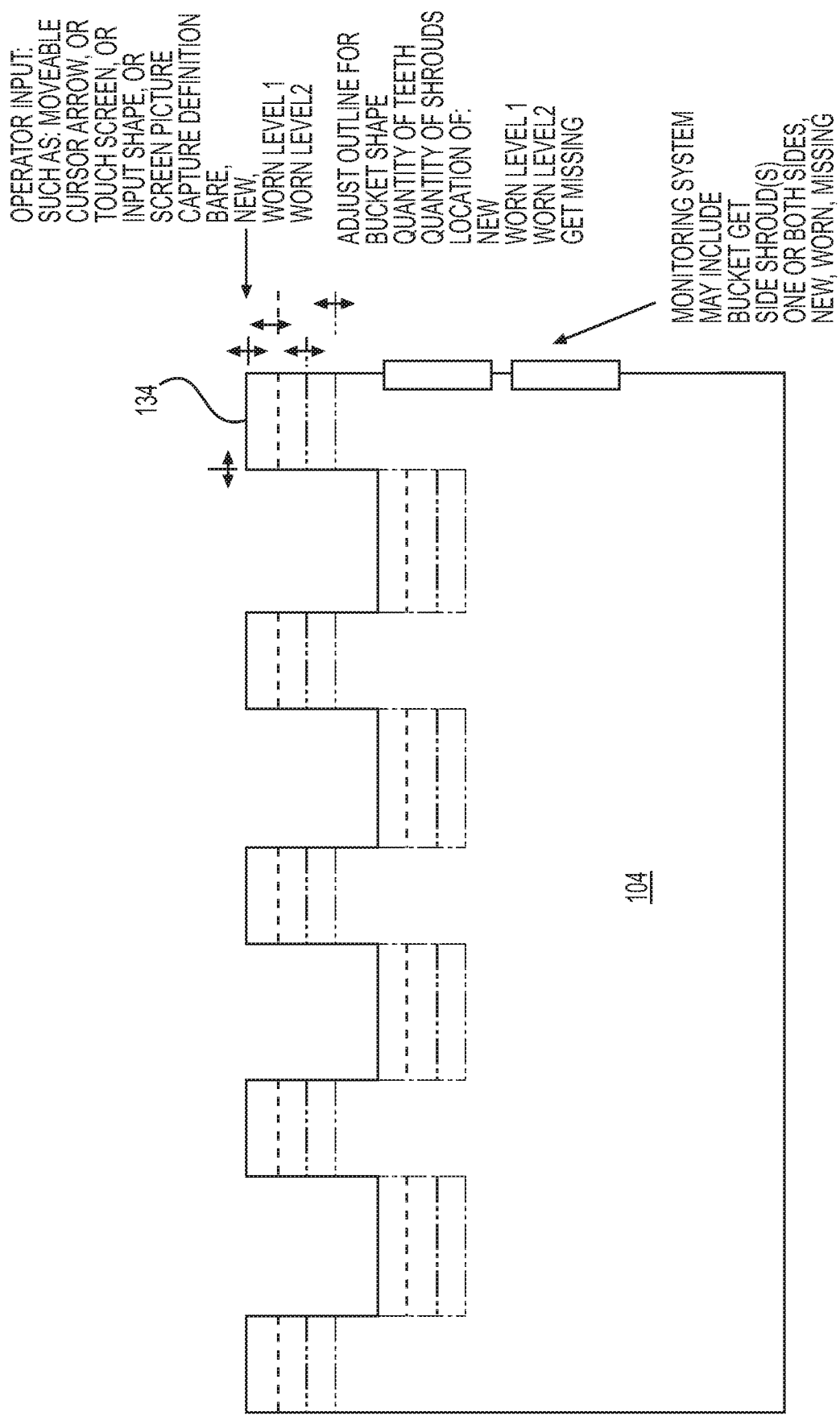
FIG. 20 depicts the use of operator input via a touch screen, mouse manipulated cursor arrow, etc. to input the shape of a work tool such as a bucket and its various ground engaging tools as well as various wear levels at which the operator or system may be alerted.

The GET monitoring system 200' may further comprise an input device 136 coupled to the electronic controller unit 126' and the electronic controller unit 126' may be configured to allow a user to input the shape of the work tool or the GET, a wear level of the work tool or the GET that requires maintenance, adjust the outline for the work tool, the quantity of ground engaging tools, the quantity of shrouds, or the condition of the shrouds (see block 916, also see FIG. 20).

Figure 21:
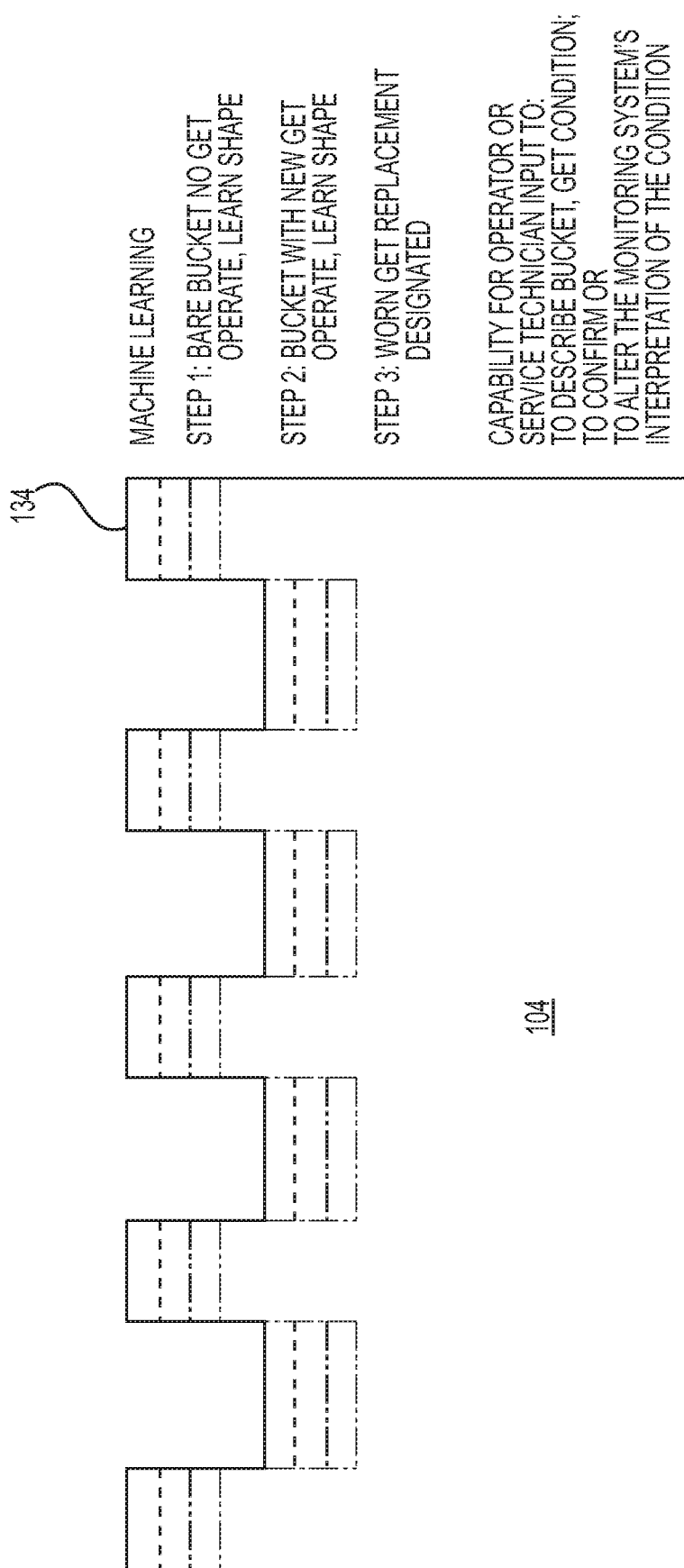
FIG. 21 illustrates how machine learning may be used with various embodiments of a tool monitoring system to determine the bare shape of a work tool such as a bucket, a bucket with new ground engaging tools attached, and a bucket with a worn ground engaging tool designated for replacement.

The electronic controller unit may be configured to use machine learning to determine at least one of the following: a bare shape of the work tool, a shape of the work tool with new ground engaging tools attached to the work tool, a shape of a worn work tool necessitating maintenance, and a shape of a worn GET necessitating maintenance (see block 918 of FIG. 31, see also FIG. 21).

INDUSTRIAL APPLICABILITY

In practice, a GET monitoring system, an electronic controller unit or method according to any embodiment described, shown or discussed herein may be sold, bought, manufactured, remanufactured, retrofitted, assembled or otherwise obtained in an aftermarket or OEM context. Similarly, a machine using such a GET monitoring system, an electronic controller unit or a method according to any embodiment described herein may be provided when the machine is new or when the machine is retrofitted with any of these embodiments.

Referring back to FIG. 14 while also looking at FIG. 16, a GET monitoring system 200 for monitoring the movement or the condition of a ground engaging tool 134 may be provided as follows. The system 200 may include a plurality of sensors 110 configured to take measurements of a ground engaging tool 134 installed on a work tool 104 from at least two different angles 202, 202', and an electronic controller unit 126 coupled to the plurality of sensors 110.

Figure 16:
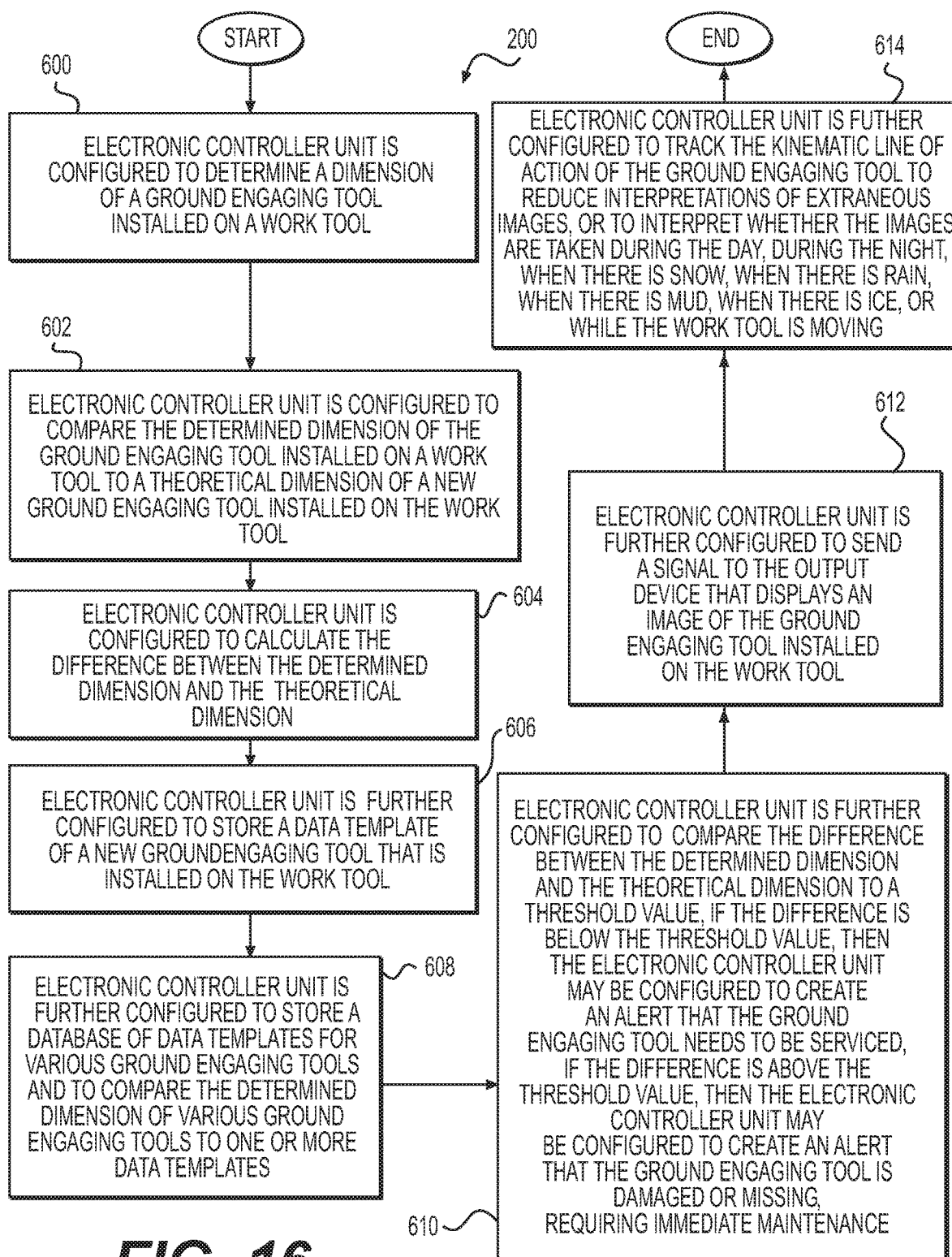
FIG. 16 contains a schematic block diagram illustrating how the electronic controller unit of the GET monitoring system of FIG. 14 may be configured.

The electronic controller unit 126 may be configured to:

determine a dimension of a ground engaging tool installed on a work tool (see FIG. 16, block 600);

compare the determined dimension of the ground engaging tool installed on a work tool to a theoretical dimension of a new ground engaging tool installed on the work tool (block 602); and calculate the difference between the determined dimension and the theoretical dimension (block 604).

In further embodiments, the electronic controller unit 126 may be further configured to store a data template 208 of a new ground engaging tool 134 that is installed on the work tool 204 (block 606). In such a case, the electronic controller unit 126 may be further configured to store a database of data templates for various ground engaging tools 134 and to compare the determined dimension of various ground engaging tools to one or more data templates (block 608).

In some embodiments, the electronic controller unit 126 may be configured to compare the difference between the determined dimension 204 and the theoretical dimension 206 to a threshold value, if the difference is below the threshold value, then the electronic controller unit 126 may be configured to create an alert that the ground engaging tool 134 needs to be serviced, if the difference is above the threshold value, then the electronic controller unit 126 may be configured to create an alert that the ground engaging tool 134 is damaged or missing, requiring immediate maintenance (block 610). There may be a second threshold value lower than the first threshold value. In such a case, if the difference is lower than the second threshold value, then no alert may be created.

In still further embodiments, an output device 132 may be in communication with the electronic controller unit 126 and the electronic controller unit 126 may be further configured to send a signal to the output device 132 that displays an image of the ground engaging tool 134 installed on the work tool 204 (block 612).

In yet further embodiments, the electronic controller unit 126 may be configured to track the kinematic line of action 218 of the ground engaging tool 134 to reduce interpretations of extraneous images, or to interpret whether the images are taken during the day, during the night, when there is snow, when there is rain, when there is mud, when there is ice, or while the work tool 204 is moving (block 614).

Figure 17:
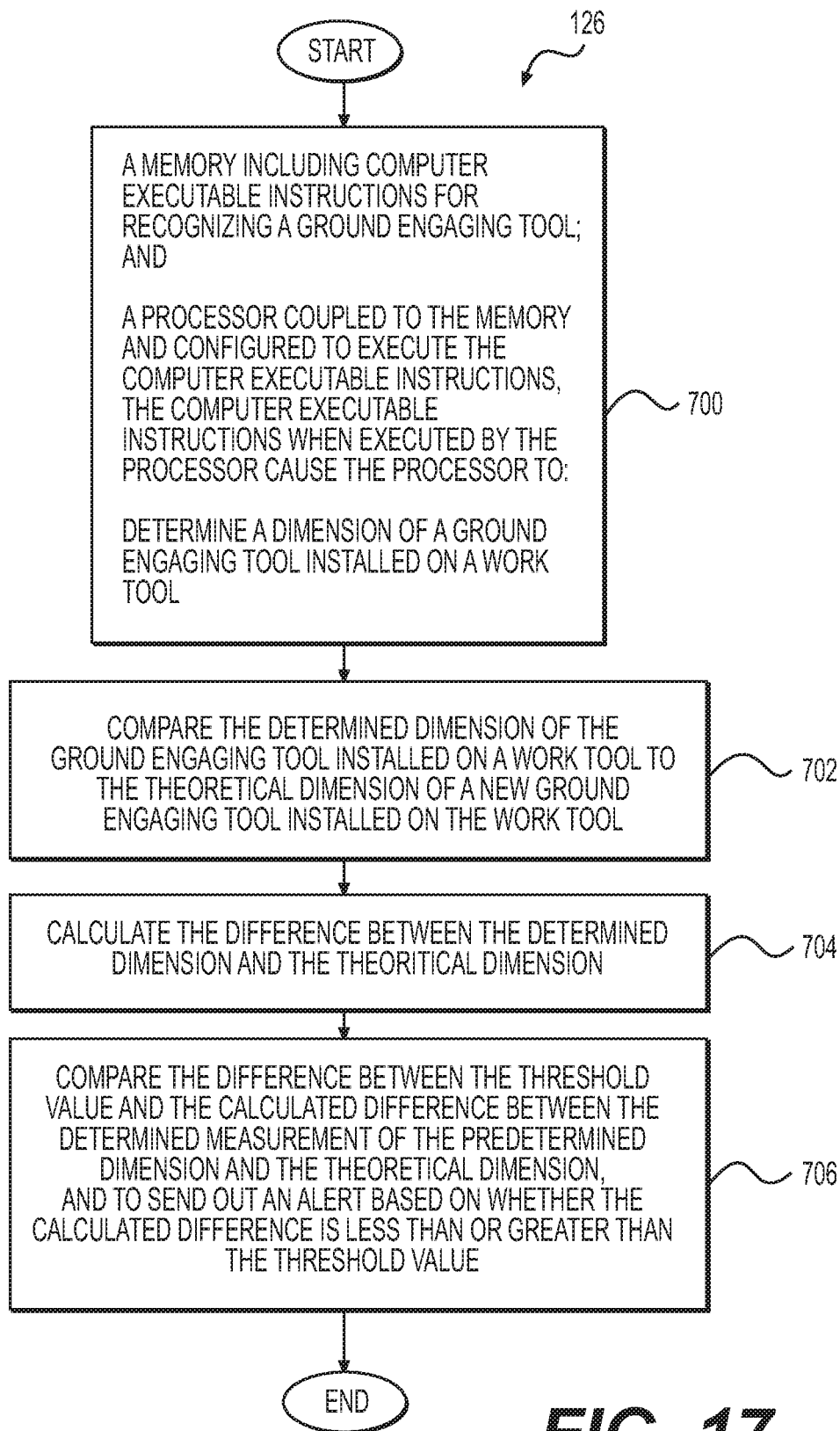
FIG. 17 contains a schematic block diagram depicting how a processor executes a set of computer executable instructions that may be used by the GET monitoring system of FIG. 14.
Figure 18:
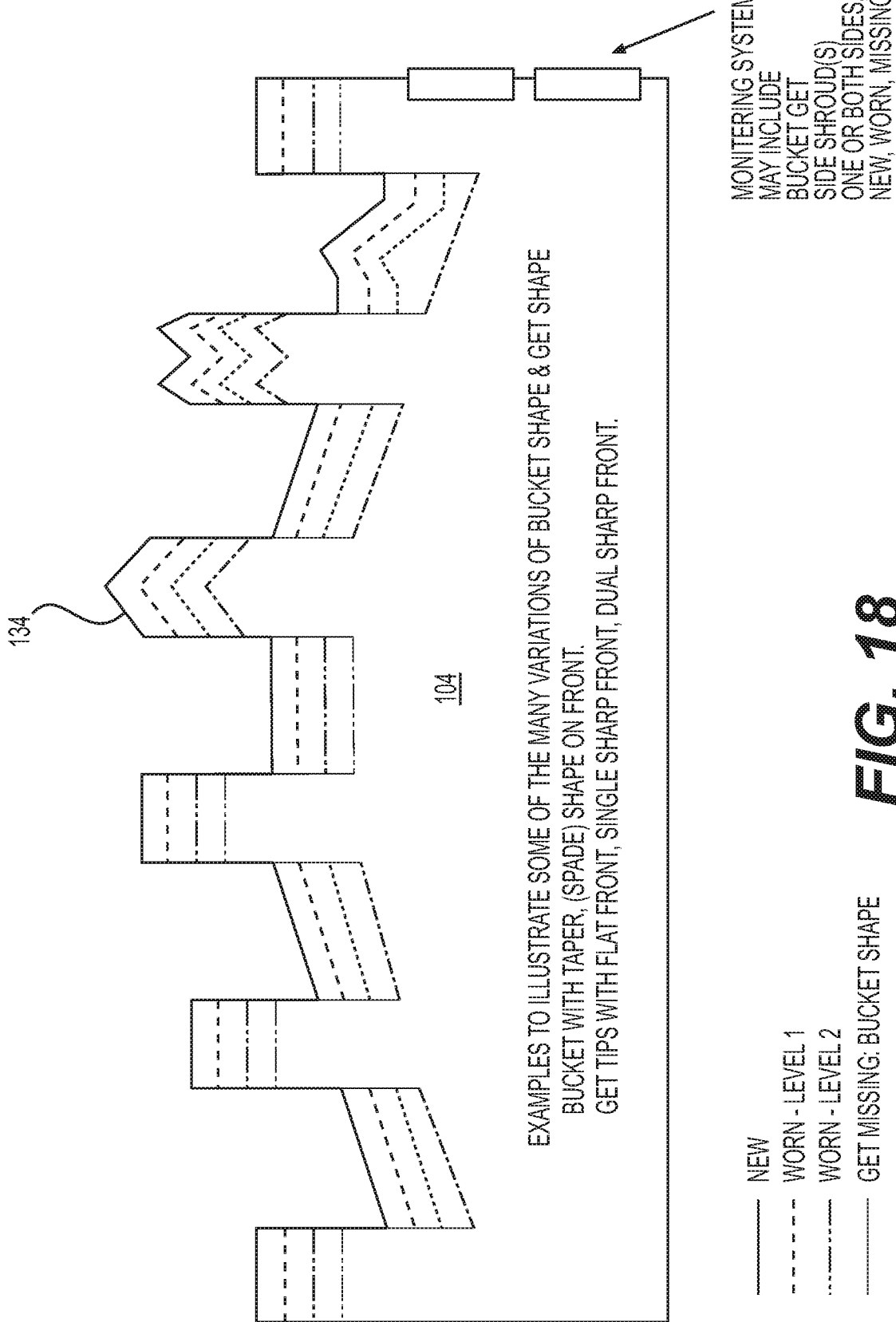
FIG. 18 illustrates some of the many profiles of a work tool such as a bucket and its associated ground engaging tools that may be monitored using various embodiments of the tool monitoring systems and methods disclosed herein.
Figure 19:
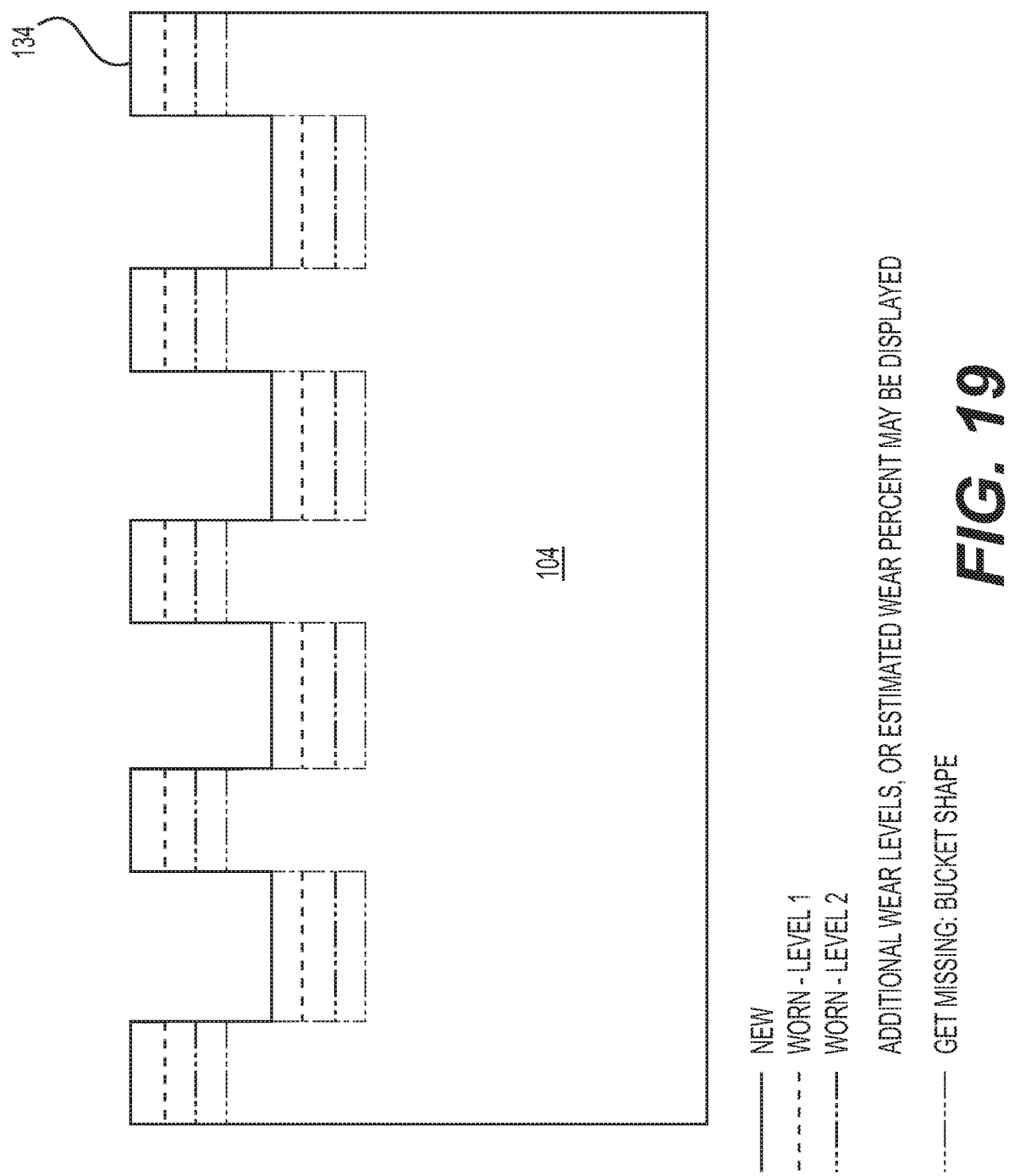
FIG. 19 contains a schematic profile of a work tool such as a bucket including its ground engaging tools showing various levels of wear at which the operator or system may be alerted. These various levels of wear may be pre-programmed into various embodiments of the tool monitoring systems and methods disclosed herein.

In certain embodiments, as understood looking at FIG. 14 and FIG. 17, an electronic controller unit 126 of a machine 102 may comprise:

a memory 508 including computer executable instructions 510 for recognizing a ground engaging tool 134; and a processor 506 coupled to the memory 508 and configured to execute the computer executable instructions 510, the computer executable instructions 510 when executed by the processor 506 cause the processor 506 to:

determine a dimension of a ground engaging tool installed on a work tool (see FIG. 17, block 700);

compare the determined dimension of the ground engaging tool installed on a work tool to the theoretical dimension of a new ground engaging tool installed on the work tool (block 702); and calculate the difference between the determined dimension and the theoretical dimension (block 704).

The memory 508 may include a threshold value matched to the determined dimension 204 of the ground engaging tool 134 and the processor 506 may be configured to compare the difference between the threshold value and the calculated difference between the determined measurement of the predetermined dimension and the theoretical dimension 206, and to send out an alert based on whether the calculated difference is less than or greater than the threshold value (block 706).

Figure 32:
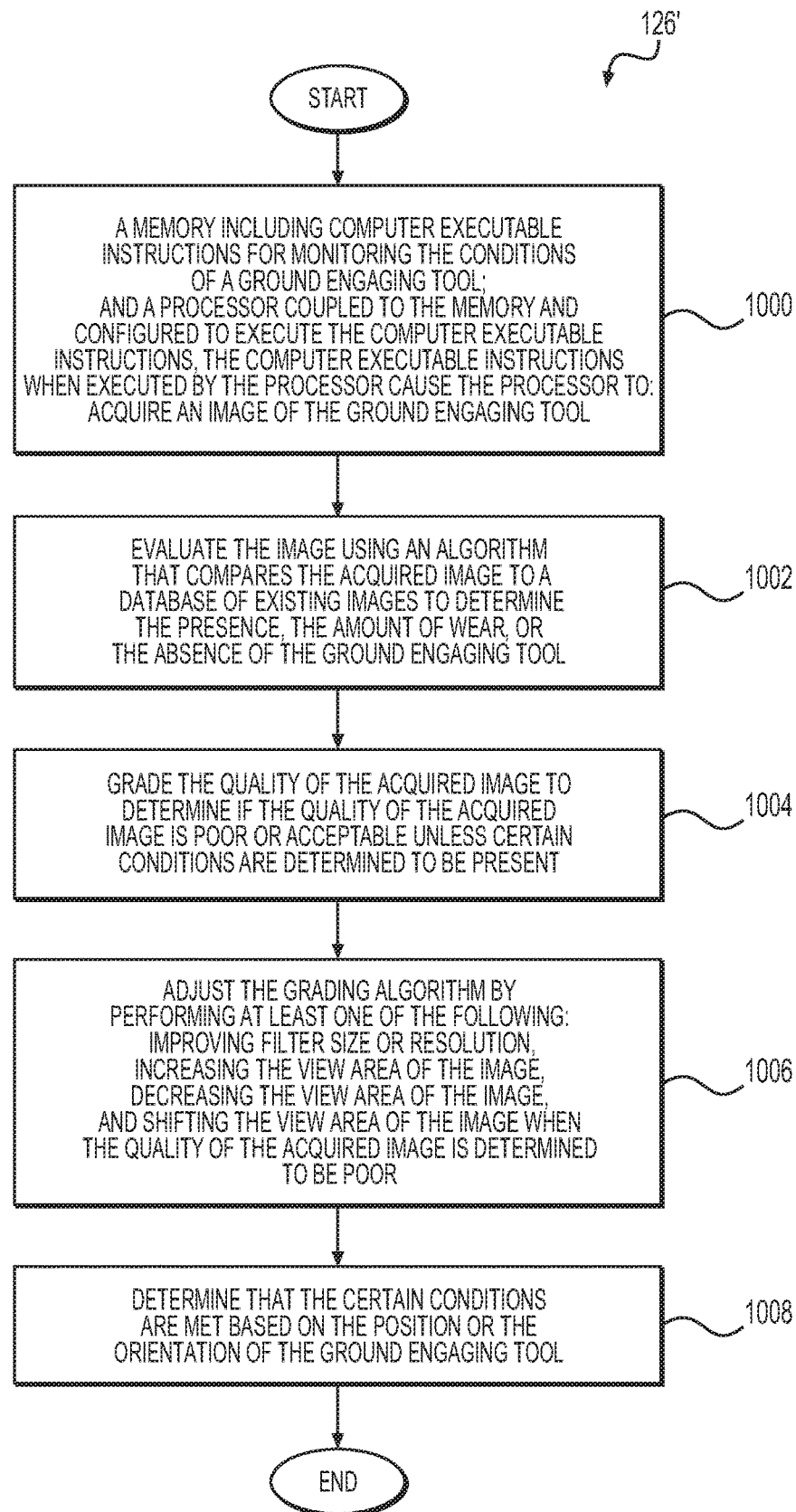
FIG. 32 contains a schematic block diagram depicting how a processor executes a set of computer executable instructions that may be used by the GET monitoring system of FIG. 14.

Yet another embodiment of the present disclosure for an electronic controller unit 126' will now be discussed looking at FIGS. 14 and 32. The electronic control unit 126' may comprise a memory 508 including computer executable instructions 510 for monitoring the condition of a ground engaging tool 134, and a processor 506 coupled to the memory 508 and configured to execute the computer executable instructions 510, the computer executable instructions 510 when executed by the processor 506 cause the processor 506 to:

acquire an image of the ground engaging tool (see block 1000 of FIG. 32);

evaluate the image using an algorithm that compares the acquired image to a database of existing images to determine the damage, the amount of wear, or the absence of the ground engaging tool (see block 1002); and grade the quality of the acquired image to determine if the quality of the acquired image is poor or acceptable unless certain conditions are determined to be present (see block 1004).

Furthermore, the computer executable instructions 510 when executed by the processer 506 cause the processor 506 to adjust the grading algorithm by performing at least one of the following: improving a filter size or a resolution, increasing a view area of the image, decreasing the view area of the image, and shifting the view area of the image when the quality of the acquired image is determined to be poor (see block 1006).

In some embodiments, the computer executable instructions when executed by the process cause the processor to determine that the certain conditions are met based on a position or an orientation of the ground engaging tool (see block 1008).

Figure 15:
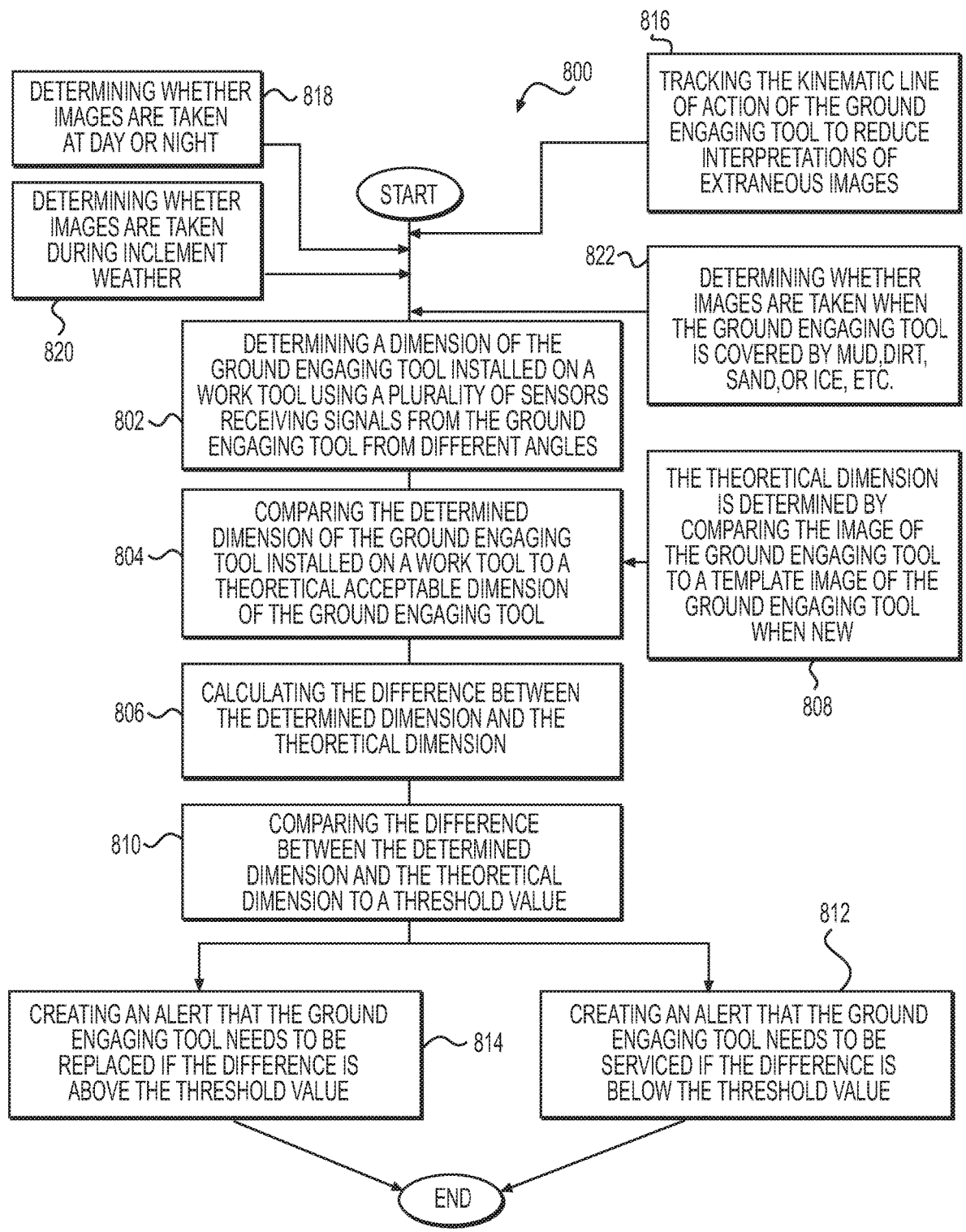
FIG. 15 is a flow chart depicting a method using a GET monitoring system according to an embodiment of the present disclosure.

Focusing now on FIG. 15, a method 800 for monitoring the condition of a ground engaging tool may be described as follows. The method 800 may comprise:

determining a dimension of the ground engaging tool installed on a work tool using a plurality of sensors receiving signals from the ground engaging tool from different angles (step 802);

comparing the determined dimension of the ground engaging tool installed on a work tool to a theoretical acceptable dimension of the ground engaging tool (step 804); and calculating the difference between the determined dimension and the theoretical dimension (step 806).

In some embodiments, the theoretical dimension is determined by comparing the image of the ground engaging tool to a template image of the ground engaging tool when new (step 808).

In other embodiments, the method 800 may further comprise comparing the difference between the determined dimension and the theoretical dimension to a threshold value (step 810).

The method 800 may further comprise creating an alert that the ground engaging tool needs to be serviced if the difference is below the threshold value (step 812).

Alternatively, the method 800 may further comprise creating an alert that the ground engaging tool needs to be replaced if the difference is above the threshold value (step 814).

The method 800 may further comprise tracking the kinematic line of action of the ground engaging tool to reduce interpretations of extraneous images (step 816).

The method 800 further comprising determining whether images are taken at day or night (step 818).

Also, the method 800 further comprising determining whether images are taken during inclement weather (step 820).

In yet further embodiments, the method 800 may further comprise determining whether images are taken when the ground engaging tool is covered by mud, dirt, sand, or ice, etc. (step 822).

Certain variables may be chosen depending on the application to obtain the desired result for the GET monitoring system. For example, the dimensions of wear for the GET may be measured in millimeters, certain camera specifications and their relative placement to the ground engaging tool(s) may be chosen, the distance from the camera to a GET may be selected, the camera field of view may be varied depending on the application (e.g. a wide field of view may be desirable), a desired % of screen filled with the view of the GET may be ascertained, the camera and monitor resolution may be chosen, and the camera area of bucket coverage may be modified, etc.

Figure 22:
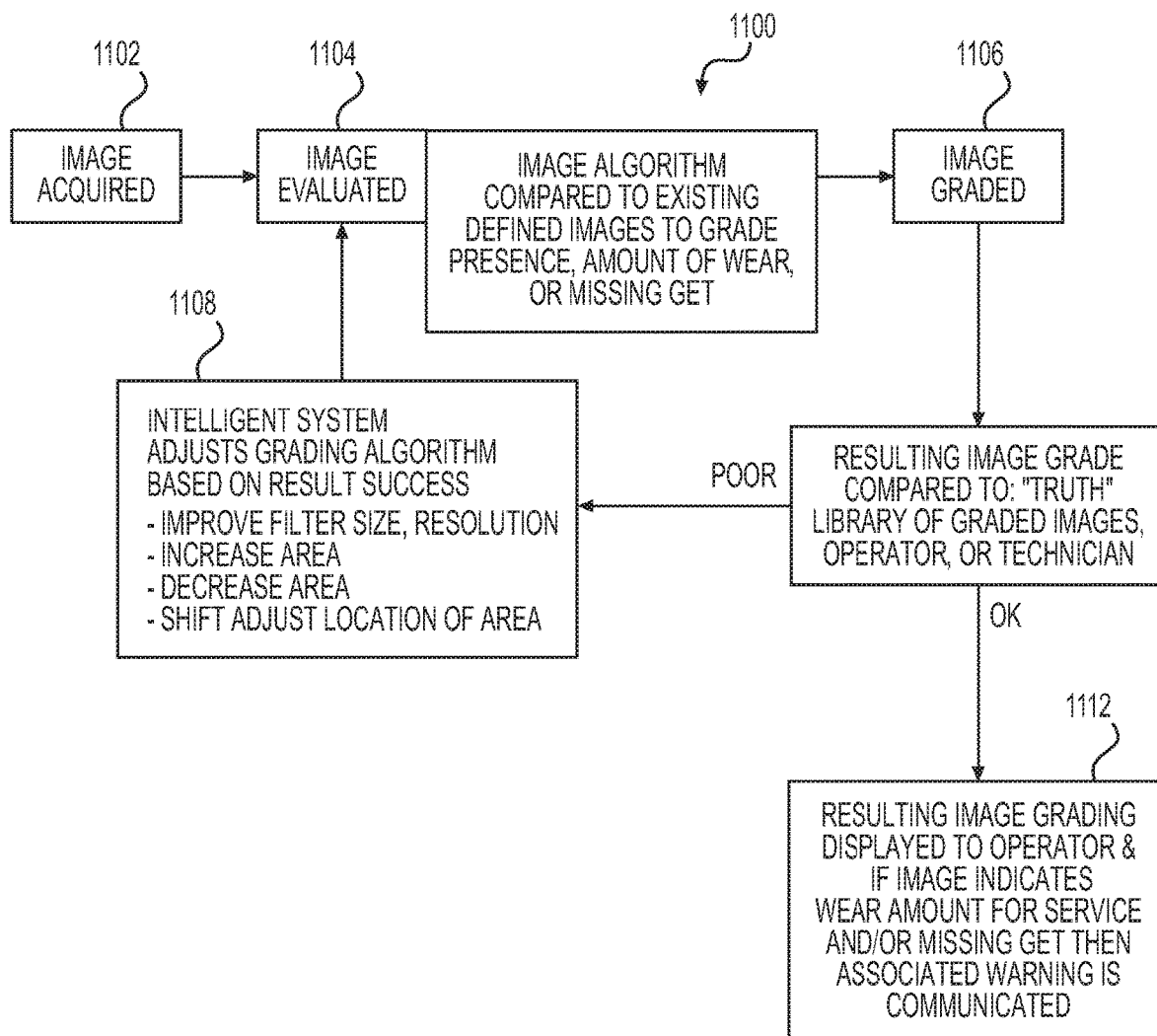
FIG. 22 contains a flow chart of another embodiment of a method for monitoring the condition of a ground engaging tool where the data sensed by the sensor such as images captured by a camera may be graded for quality.
Figure 23:
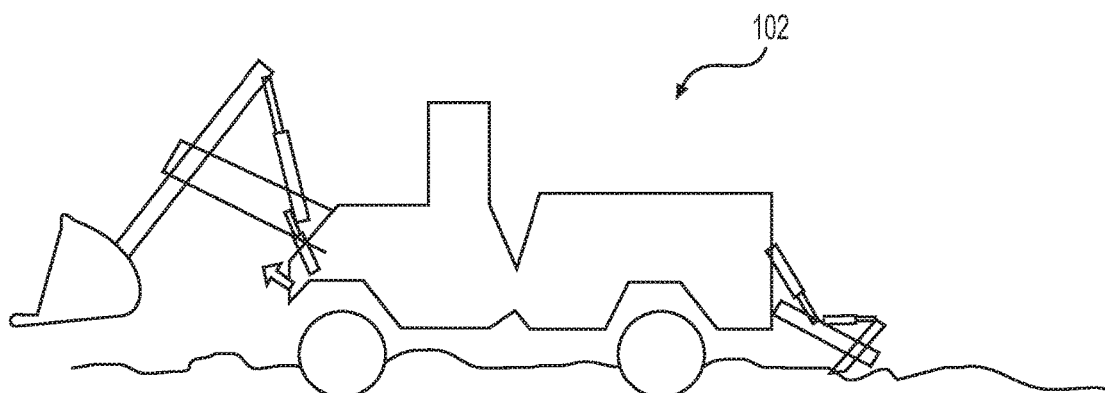
FIG. 23 is a depiction of a machine such as a backhoe or the like that includes other types of work tools including a ripper or a scarifier and the like with the ground engaging tool in the ground.
Figure 24:
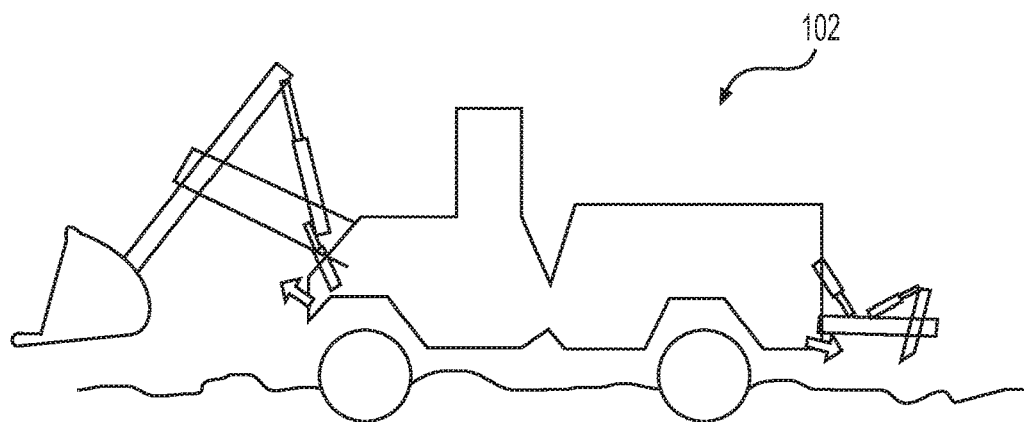
FIG. 24 shows the machine of FIG. 23 except the ground engaging tool having been raised such that the ground engaging tool is no longer in the ground allowing the condition of the ground engaging tool to be more easily monitored.
Figure 25:
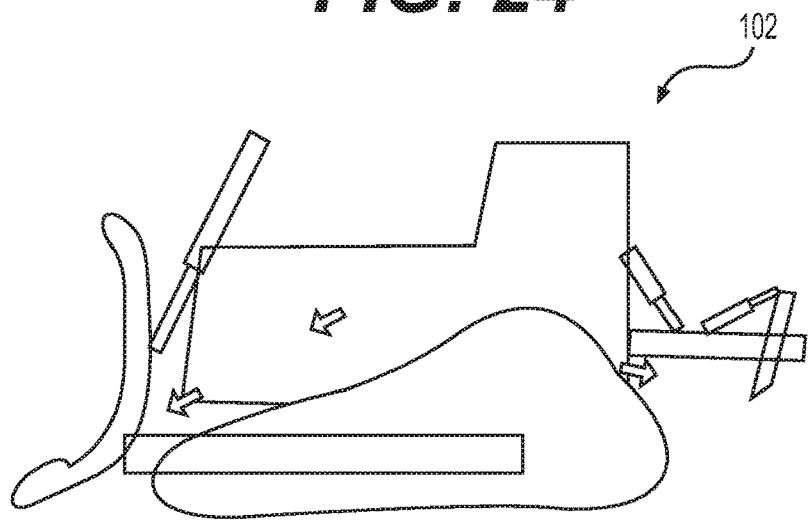
FIG. 25 is a depiction of a bulldozer with a blade having ground engaging tools being monitored using various systems and methods disclosed herein.
Figure 30:
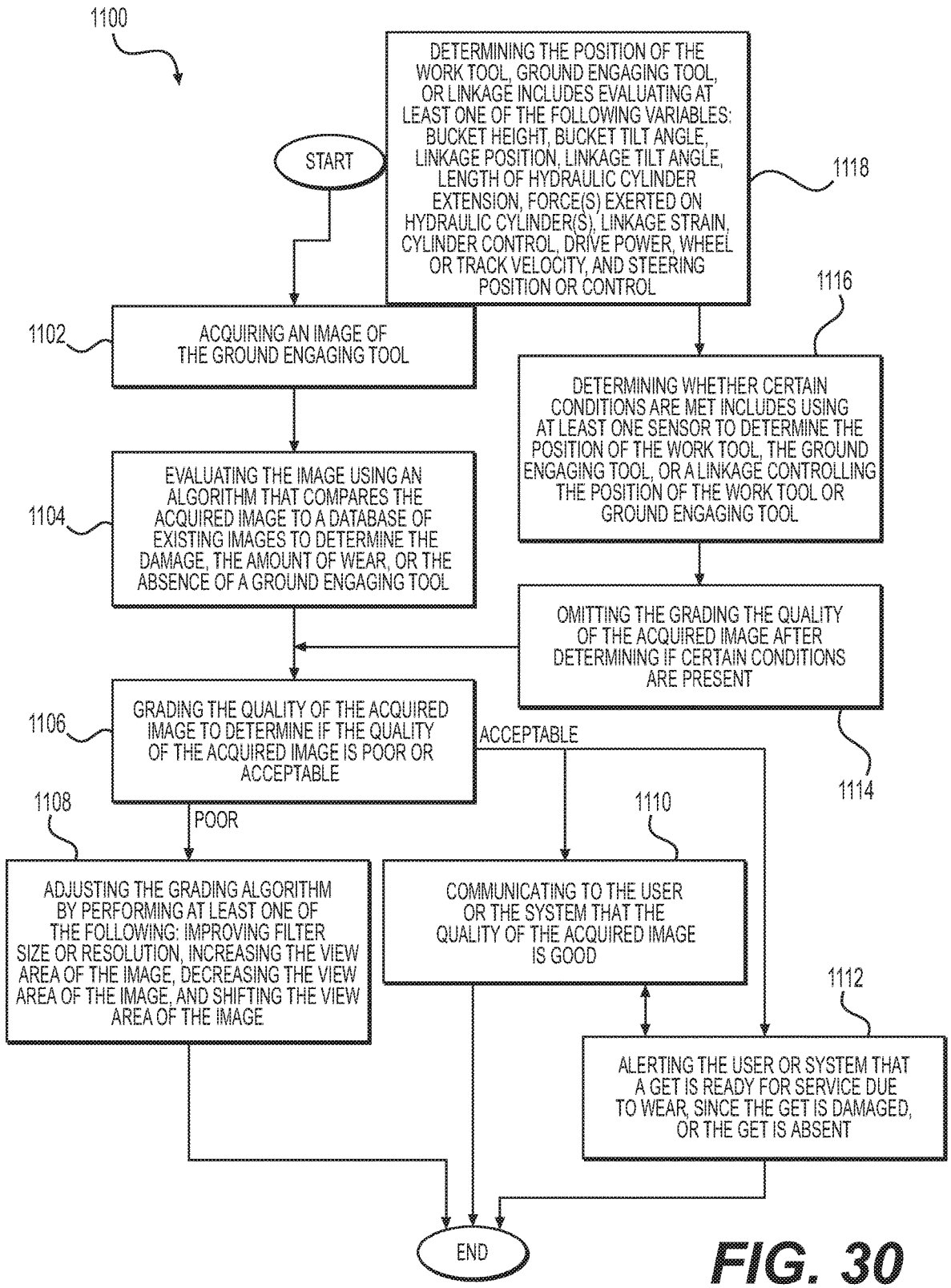
FIG. 30 is a flow chart depicting a method of using a GET monitoring system according to another embodiment of the present disclosure.

Referring now to FIGS. 22 and 30, a method 1100 according to another embodiment of the present disclosure will now be discussed.

The method 1100 for monitoring the condition of a ground engaging tool attached to a work tool of a machine using a GET monitoring system may comprise:

acquiring an image of the ground engaging tool (step 1102), evaluating the image using an algorithm that compares the acquired image to a database of existing images to determine the presence, the amount of wear, or the absence of the ground engaging tool (step 1104), and grading the quality of the acquired image to determine if the quality of the acquired image is poor or acceptable (step 1106).

The quality of the acquired image may be determined to be poor. If so, the method 1100 may further comprise adjusting the grading algorithm by performing at least one of the following: improving a filter size or a resolution, increasing a view area of the image, decreasing the view area of the image, and shifting the view area of the image (step 1108).

In other cases, the quality of the acquired image may be determined to be acceptable. If so, the method 1100 may further comprise communicating to a user or a system that the quality of the acquired image is acceptable (step 1110) and/or alerting a user or a system that the GET is ready for service due to wear, since the GET is damaged, or the GET is absent (step 1112).

In some cases, the method 1100 may further comprise omitting the grading of the quality of the acquired image after determining if certain conditions are present (step 1114).

For example, determining whether certain conditions are met may include using at least one sensor to determine the position of the work tool, the ground engaging tool, or a linkage controlling the position of the work tool or the ground engaging tool (step 1116). More particularly, in some cases, determining the position of the work tool, the ground engaging tool, or the linkage may include evaluating at least one of the following variables: a bucket height, a bucket tilt angle, a linkage position, a linkage tilt angle, a length of hydraulic cylinder extension, a force exerted on a hydraulic cylinder, a linkage strain, a cylinder control, a drive power, a wheel or a track velocity, and a steering position or control (step 1118).

It will be appreciated that the foregoing description provides examples of the disclosed assembly and technique. However, it is contemplated that other implementations of the disclosure may differ in detail from the foregoing examples. All references to the disclosure or examples thereof are intended to reference the particular example being discussed at that point and are not intended to imply any limitation as to the scope of the disclosure more generally. All language of distinction and disparagement with respect to certain features is intended to indicate a lack of preference for those features, but not to exclude such from the scope of the disclosure entirely unless otherwise indicated.

Recitation of ranges of values herein are merely intended to serve as a shorthand method of referring individually to each separate value falling within the range, unless otherwise indicated herein, and each separate value is incorporated into the specification as if it were individually recited herein.

It will be apparent to those skilled in the art that various modifications and variations can be made to the embodiments of the apparatus and methods of assembly as discussed herein without departing from the scope or spirit of the invention(s). Other embodiments of this disclosure will be apparent to those skilled in the art from consideration of the specification and practice of the various embodiments disclosed herein. For example, some of the equipment may be constructed and function differently than what has been described herein and certain steps of any method may be omitted, performed in an order that is different than what has been specifically mentioned or in some cases performed simultaneously or in sub-steps. Furthermore, variations or modifications to certain aspects or features of various embodiments may be made to create further embodiments and features and aspects of various embodiments may be added to or substituted for other features or aspects of other embodiments in order to provide still further embodiments.

Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

What is claimed is:

1. A method comprising:
   acquiring an image of a ground engaging tool attached to a work tool;
   evaluating the acquired image of the ground engaging tool using an algorithm that compares the acquired image of the ground engaging tool to one or more existing images to determine an amount of wear of the ground engaging tool or an absence of the ground engaging tool;
   grading a quality of the acquired image of the ground engaging tool;
   determining that the quality of the acquired image of the ground engaging tool is poor;
   improving a resolution of the acquired image based on determining that the quality of the acquired image of the ground engaging tool is poor; and
   using machine learning to determine at least one of a bare shape of the work tool, a shape of the work tool with new ground engaging tools attached to the work tool, a shape of a worn work tool necessitating maintenance, or a shape of a worn ground engaging tool necessitating maintenance.

2. The method of claim 1, further comprising:
   performing at least one of:
     increasing a view area of the acquired image,
     decreasing the view area of the acquired image, or
     shifting the view area of the acquired image.

3. The method of claim 1, further comprising:
   alerting a user or a system that the ground engaging tool is ready for service due to the amount of wear of the ground engaging tool or that the ground engaging tool is absent.

4. The method of claim 1, further comprising:
   determining that one or more conditions are met; and
   omitting grading a quality of a different image based on determining that the one or more conditions are met.

5. The method of claim 4, wherein determining the one or more conditions are met includes:
   determining that the one or more conditions are met using at least one sensor on a machine that includes the work tool.

6. The method of claim 4, wherein
   determining a position of the work tool or the ground engaging tool by evaluating at least one of: a bucket height, a bucket tilt angle, a linkage position, a linkage tilt angle, a length of hydraulic cylinder extension, a force exerted on a hydraulic cylinder, a linkage strain, a cylinder control, a drive power, a wheel or a track velocity, or a steering position or control,
   wherein the one or more one or more conditions are determined to be met based on the position.

7. The method of claim 1, wherein the acquired image of the ground engaging tool is acquired from a camera mounted on a boom of a machine that includes the work tool.

8. The method of claim 1, wherein the acquired image of the ground engaging tool is one of a plurality of images of the ground engaging tool taken by at least two cameras installed on the work tool.

9. The method of claim 1, wherein the acquired image of the ground engaging tool is acquired from a camera configured to view a bottom of the work tool and a plurality of ground engaging tools, and
   wherein the plurality of ground engaging tools include the ground engaging tool.

10. A system comprising:
    a memory; and
    one or more processors configured to:
      acquire an image of a ground engaging tool installed on a work tool;
      evaluate the acquired image of the ground engaging tool using an algorithm that compares the acquired image of the ground engaging tool to one or more existing images to determine an amount of damage of the ground engaging tool, an amount of wear of the ground engaging tool, or an absence of the ground engaging tool;
      grade a quality of the acquired image of the ground engaging tool;
      determine that the quality of the acquired image of the ground engaging tool is poor;
      improve a resolution of the acquired image based on determining that the quality of the acquired image of the ground engaging tool is poor; and
      use machine learning to determine at least one of a bare shape of the work tool, a shape of the work tool with new ground engaging tools attached to the work tool, a shape of a worn work tool necessitating maintenance, or a shape of a worn ground engaging tool necessitating maintenance.

11. The system of claim 10, wherein the one or more processors are further configured to:
perform, based on determining that the quality of the acquired image of the ground engaging tool is poor, at least one of:
improving a filter size,
increasing a view area of the acquired image,
decreasing the view area of the acquired image, or
shifting the view area of the acquired image.

12. The system of claim 10, wherein the one or more processors are further configured to:
communicate that a quality of a different image is acceptable.

13. The system of claim 10, wherein the one or more processors are further configured to:
determine a position of the work tool or the ground engaging tool based on at least one of a bucket height, a bucket tilt angle, a linkage position, a linkage tilt angle, a length of hydraulic cylinder extension, a force exerted on a hydraulic cylinder, a linkage strain, a cylinder control, a drive power, a wheel or a track velocity, or a steering position or control; and
determine that one or more conditions are not met based on the position,
wherein the quality is graded based on determining that the one or more conditions are not met.

14. The system of claim 10, wherein the one or more processors are further configured to:
alert a user or a system that the ground engaging tool or the work tool is ready for service based on the amount of wear of the ground engaging tool or based on the ground engaging tool being absent.

15. The system of claim 10, wherein the one or more processors are further configured to:
determine if one or more conditions are met; and
omit grading a quality of a different image if the one or more conditions are met.

16. The system of claim 10, further comprising:
an input device configured to receive an input identifying a shape of the work tool or the ground engaging tool, a wear level of the work tool or the ground engaging tool.

17. The system of claim 10, wherein the acquired image of the ground engaging tool is one of a plurality of images of the ground engaging tool taken by at least two cameras installed on the work tool.

18. A non-transitory computer readable medium, comprising:
one or more instructions that, when executed by a processor, cause the processor to:
acquire an image of a ground engaging tool attached to a work tool;
evaluate the acquired image of the ground engaging tool using an algorithm that compares the acquired image of the ground engaging tool to one or more existing images to determine an amount of wear of the ground engaging tool or an absence of the ground engaging tool;
grade a quality of the acquired image of the ground engaging tool;
determine that the quality of the acquired image of the ground engaging tool is poor;
improve a resolution of the acquired image based on determining that the quality of the acquired image of the ground engaging tool is poor; and
use machine learning to determine at least one of a bare shape of the work tool, a shape of the work tool with new ground engaging tools attached to the work tool, a shape of a worn work tool necessitating maintenance, or a shape of a worn ground engaging tool necessitating maintenance.

19. The non-transitory computer readable medium of claim 18, wherein the one or more instructions further cause the processor to:
perform, based on determining that the quality of the acquired image of the ground engaging tool is poor, at least one of:
increasing a view area of the acquired image,
decreasing the view area of the acquired image, or
shifting the view area of the acquired image.

20. The non-transitory computer readable medium of claim 18, wherein the one or more instructions further cause the processor to:
determine that one or more conditions are not met based on a position or an orientation of the ground engaging tool,
wherein the quality is graded based on determining that the one or more conditions are not met.

* * * * *